(12) United States Patent
Hosoya

(10) Patent No.: US 7,987,429 B2
(45) Date of Patent: Jul. 26, 2011

(54) DATA MANAGEMENT APPARATUS AND METHOD, RECORDING MEDIUM RECORDING DATA MANAGEMENT PROGRAM, AND CAMERA

(75) Inventor: Motoi Hosoya, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 893 days.

(21) Appl. No.: 11/897,050

(22) Filed: Aug. 28, 2007

(65) Prior Publication Data
US 2008/0059895 A1 Mar. 6, 2008

(30) Foreign Application Priority Data
Aug. 30, 2006 (JP) ................. 2006-234521

(51) Int. Cl.
*G06F 9/1445* (2006.01)
(52) U.S. Cl. ........ 715/762; 715/786; 715/804; 345/158; 707/10; 709/223; 705/1
(58) Field of Classification Search .......... 715/200–277, 715/786, 804; 700/701–799, 800–866; 707/10; 84/600; 709/201–229; 705/50–79; 345/30–111, 345/156–158, 169; 701/201–208
See application file for complete search history.

(56) References Cited

U.S. PATENT DOCUMENTS

| | | | |
|---|---|---|---|
| 7,545,363 B2* | 6/2009 | Kaneko et al. | 345/158 |
| 2005/0204024 A1* | 9/2005 | Asami | 709/223 |
| 2006/0201310 A1* | 9/2006 | Takashima et al. | 84/600 |
| 2007/0094611 A1* | 4/2007 | Sasaki | 715/804 |
| 2007/0162300 A1* | 7/2007 | Roever et al. | 705/1 |
| 2009/0031246 A1* | 1/2009 | Cowtan et al. | 715/786 |
| 2009/0043783 A1* | 2/2009 | Wakasa et al. | 707/10 |
| 2010/0094546 A1* | 4/2010 | Ujino | 701/208 |

FOREIGN PATENT DOCUMENTS

| | | |
|---|---|---|
| JP | 2004-255740 | 9/2004 |
| JP | 2005-151115 | 6/2005 |
| JP | 2006-157825 | 6/2006 |

* cited by examiner

*Primary Examiner* — Ruay L Ho
(74) *Attorney, Agent, or Firm* — John C. Pokotylo; Straub & Pokotylo

(57) ABSTRACT

There is disclosed a data management apparatus having a display screen, which includes (1) a first area for displaying a list of title information representing data belonging to a specified category and capable of changing the list in response to changing the category specification, and (2) a second area in which no display content is changed despite changing the category specification, wherein at least either of copying and moving of any title information can be performed at least from the first area to the second area. In addition to the data management apparatus, the present invention can be understood as the invention of a camera including the data management apparatus, a data management method, and a recording medium recording a data management program.

9 Claims, 15 Drawing Sheets

DATA MANAGEMENT APPARATUS AND METHOD, RECORDING MEDIUM RECORDING DATA MANAGEMENT PROGRAM, AND CAMERA

CROSS-REFERENCE TO RELATED APPLICATION

This application is based upon and claims the benefit of priority from prior Japanese Patent Application No. 2006-234521, filed on Aug. 30, 2006, the entire contents of which are incorporated herein by reference.

BACKGROUND OF THE INVENTION

1. Field of the Invention

The present invention relates to a data management apparatus and method for managing data represented by title information, a recording medium recording a data management program, and a camera.

2. Description of the Related Art

Upon managing data, data name, content summary, address, attribute, etc. may be used as title information to identify target data. For example, if the data is music data, the title of the music can be used as the title information. If the data is photo or image data, the thumbnail image can be used as the title information. If the data is web data, the URL (address) can be used as the title information. However, any other kind of correspondence between data category and title information is possible and is not limited to the above-mentioned correspondences. The title information can also be called label information or index information.

In a data management apparatus for displaying title information to manage or retrieve data the content of which is represented by this title information, some contrivance is required to display the data as the number of target data increases.

For example, if data is image data, its thumbnail image is often used and displayed as the title information to manage the data. The use of the thumbnail image as the title information makes it easy to check the data content as an image, compared to the case of use of a file name represented merely by a string of characters as the title information. The thumbnail image is widely used not only to search for the image, but also to check the image in various processing.

There are many proposals related to such a thumbnail image. For example, Japanese Patent Application Laid-Open No. 2004-255740 teaches a technique for displaying, as a list of thumbnail images, groups of images shot on the same shooting date, a technique for displaying, as a list of thumbnail images, a group of images instructed to be printed, and the like.

Japanese Patent Application Laid-Open No. 2006-157825 teaches a technique for dividing a screen into a plurality of areas in such a manner that thumbnails of shot images are displayed in one area and a print candidate image is displayed in a larger size than the thumbnails of the shot images in any other area in parallel to the area for the thumbnails of the shot images. This technique makes it easy to select an image as a print target from among a great number of images.

Japanese Patent Application Laid-Open No. 2005-151115 discloses an imaging apparatus, which lists thumbnail images and displays small-size print icon and erase icon at the bottom of the list so that a user can specify a thumbnail image of the image the user wants to process and an icon indicating a processing content for the image in order to perform the specified processing on the specified image.

As mentioned above, there are various proposals for user interfaces using the thumbnail image upon selecting an image and a processing content for the selected image.

BRIEF SUMMARY OF THE INVENTION

The data management apparatus of the present invention can display on a screen (1) a first area for displaying a list of title information representing data belonging to a specified category and capable of changing the list in response to changing the category specification, and (2) a second area in which no display content is changed despite changing the category specification, wherein at least either of copying and moving of any title information can be performed at least from the first area to the second area.

An exemplary structure of the present invention can be expressed as a data management apparatus comprising a screen creating part for creating a management screen to manage data, the management screen including (1) a title list for listing title information representing the content of data belonging to a category and capable of changing to another for listing title information representing the content of data belonging to another category, and (2) a temporary stock area arranged to be referable to this title list and capable of temporarily stocking one or more pieces of title information from the title list in such a manner that the temporarily stocked title information is always referable regardless of changing the category of the title list, wherein the data management apparatus manages data represented by the title information according to an operation of title information between the title list and the temporary stock area.

The present invention can also be understood as the invention of a camera including the data management apparatus, a data management method, and a recording medium recording a data management program.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Preferred embodiments of the invention are described below with reference to the accompanying drawings.

First Embodiment

Figure 1:
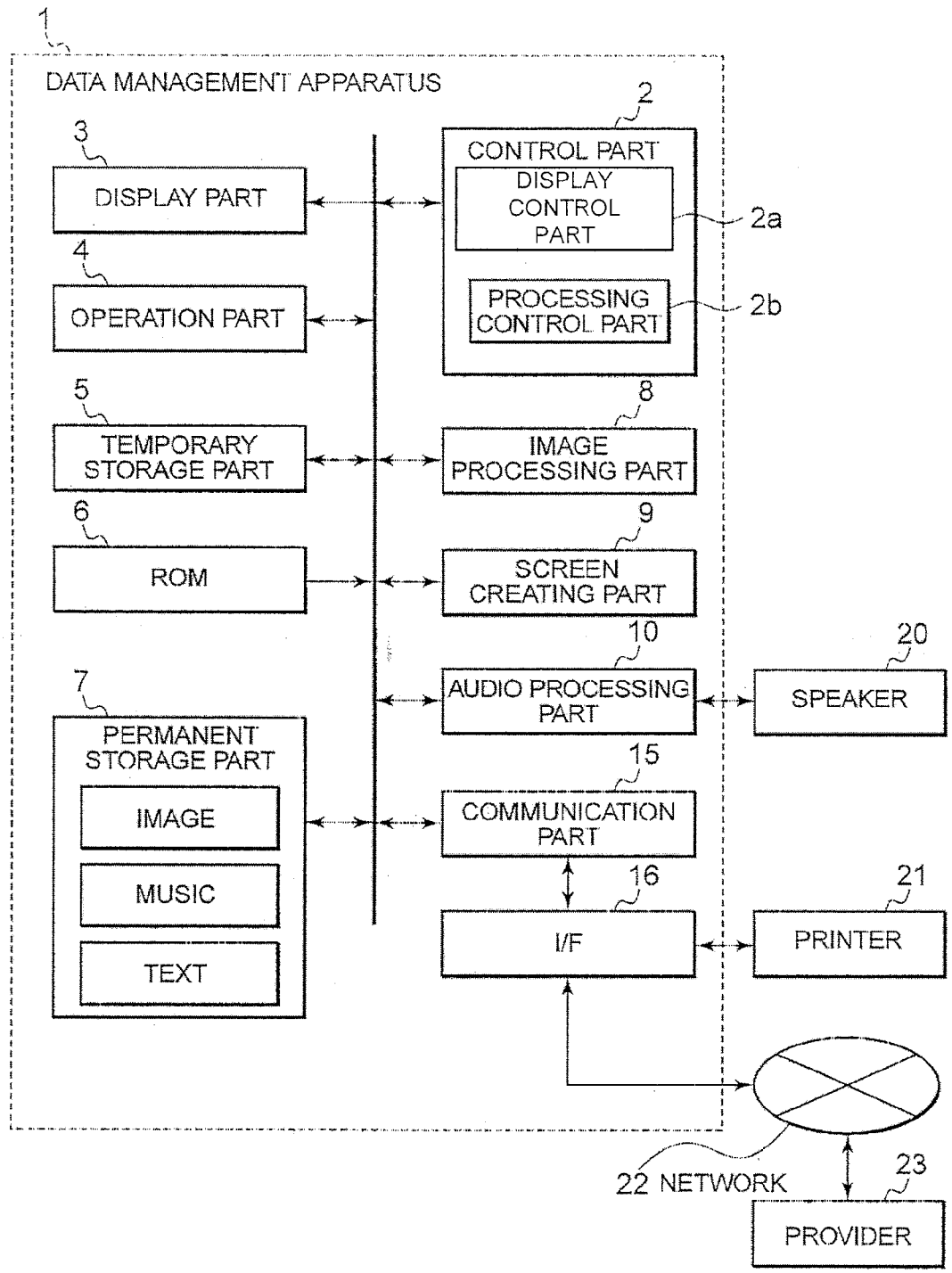
FIG. 1 is a block diagram showing the structure of a data management apparatus according to a first embodiment of the present invention.

FIGS. 1 to 17 show a first embodiment of the present invention. FIG. 1 is a block diagram showing the structure of a data management apparatus.

As shown in FIG. 1, this data management apparatus 1 includes a control part 2, a display part 3, an operation part 4, a temporary storage part 5, a ROM 6, a permanent storage part 7, an image processing part 8, a screen creating part 9, an audio processing part 10, a communication part 15, and an interface (I/F) 16.

The control part 2 performs centralized control of the data management apparatus 1, and includes a display control part 2a for performing control related to display and a processing control part 2b for performing control related to data processing.

The display part 3 displays a management screen to be described later under the control of the above-mentioned display control part 2a.

The operation part 4 is used for input to the data management apparatus 1.

The temporary storage part 5 is a volatile storage part, such as a RAM, used by the control part 2 as a working memory.

The ROM 6 is a nonvolatile storage part storing control programs (including a data management program) executed by the control part 2, and various data and the like for use in this data management apparatus 1.

The permanent storage part 7 is, for example, a hard disk or any other nonvolatile recording medium, where data in various categories such as image, music, and text are stored on a category basis.

The image processing part 8 performs various image processing on image data stored in the permanent storage part 7 or other image data, for example, those read from the outside. This image processing part 8 also performs processing for creating a thumbnail image when no thumbnail image is contained in corresponding image data.

The screen creating part 9 creates the management screen used for data management (e.g., for data editing or processing). As will be described later, this management screen includes a title list 35 (see FIG. 2) for listing title information representing the content of data, and a temporary stock area 33 (see FIG. 2) for temporary stock of title information. If data is image data, the screen creating part 9 uses, as title information, a thumbnail image contained in the header or the like of the image data, or a thumbnail image created by the image processing part 8 from the image data.

When music data is selected and music playback processing is instructed on the management screen, the audio processing part 10 generates an audio signal used for playback of the music data, and outputs it to a speaker 20 as an external device.

The communication part 15 performs processing when this data management apparatus 1 communicate with an external device.

The interface (I/F) 16 includes various connection terminals and the like used when the communication part 15 communicates with any external device.

In this example shown in FIG. 1, a printer 21 and a network 22 are connected to the interface 16. Therefore, in this example, the interface 16 includes, for example, a USB interface for connection to the printer 21, and a network interface for connection to the network 22. Note that this data management apparatus 1 is connectable to a provider 23 through the network 22, i.e., it is connectable to the Internet.

FIGS. 2 to 8 show states of a management screen 31 displayed in the display part 3 when the data management apparatus 1 is set in an edit mode. Here, the edit mode means a mode for temporarily stocking title information representing data in a category, or moving or copying the data to another category. Note that "edit" is part of "management." The following describes this edit mode.

As shown in FIGS. 2 to 8, a list area 32 and a temporary stock area 33 are arranged to be referable to each other on the management screen 31. Here, the term "referable" means that the user can view both the list area 32 and the temporary stock area 33, and operate title information from one area to another and vise verse.

A mode button section 34 and a title list 35 are displayed in the list area 32. In the example shown in FIGS. 2 to 8, a music mode button 34a, a photo mode button 34b, and a web button 34c are displayed in the mode button section 34. The music mode button 34a is a button for displaying, in the title list 35, title information related to data in a music category. The photo mode button 34b is a button for displaying, in the title list 35, title information related to data in photo category. The web button 34c is a button for displaying, in the title list 35, home pages on the Internet and the like connected through the network 22 or a provider 23.

Then, title information 36 representing the content of data belonging to one category selected in the mode button section 34 is listed in the title list 35. A scroll icon 37 is displayed, for example, on the left side of this title list 35 to enable scrolling of the list of displayed title information 36 up or down with the operation of this scroll icon 37.

The category of the title information 36 displayed in this title list 35 can change from one to another with the operation of the mode button section 34 as mentioned above. The title information 36 in this title list 35 can further be classified into subcategories in a manner mentioned later.

The temporary stock area 33 is an area for temporarily stocking one or more desired title information from plural pieces of title information displayed in the title list 35. The title information 36 temporarily stocked in this temporary stock area 33 is always referable regardless of whether the category of the title list 35 is changed or not. Further, an operation from the title list 35 to the temporary stock area 33 can be either of copying and moving. In the embodiment, copying is taken by way of example. Similarly, an operation from the temporary stock area 33 to the title list 35 can be either of copying and moving. In the embodiment, moving is taken by way of example.

Figure 2:
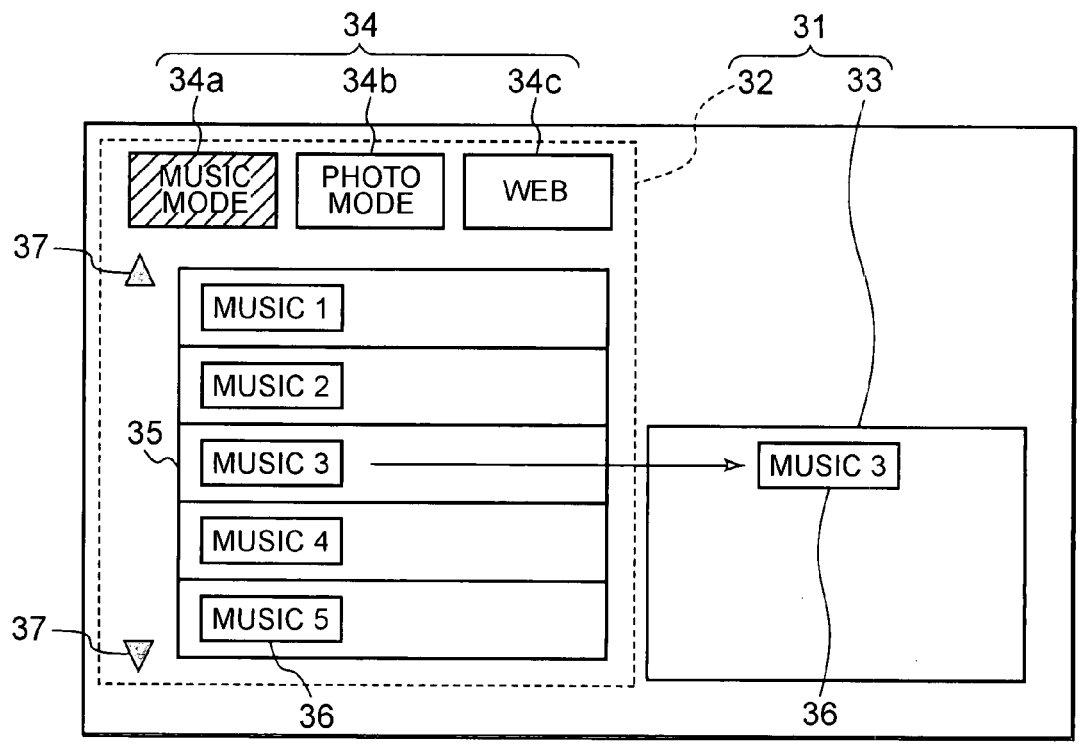
FIG. 2 is a view showing a state of a management screen upon copying title information of a music piece to a temporary stock area in the data management apparatus whose edit mode is a music mode in the first embodiment.

First, FIG. 2 shows the management screen 31 upon copying title information 36 of a music piece to the temporary stock area 33 in the data management apparatus 1 whose edit mode is the music mode. FIG. 2 is an example in which plural pieces of title information 36 representing the contents of respective music pieces (specifically, title information 36 of "MUSIC 1" to "MUSIC 5") are displayed in the title list 35 by operating the music mode button 34a. In this example, the title information 36 of "MUSIC 1" to "MUSIC 5" is displayed in the title list 35 while being classified into independent subcategories, respectively.

In such a state, for example, if the user drags and drops the title information 36 of "MUSIC 3" from the title list 35 to the temporary stock area 33, the title information 36 of "MUSIC 3" is copied in the temporary stock area 33.

Figure 3:
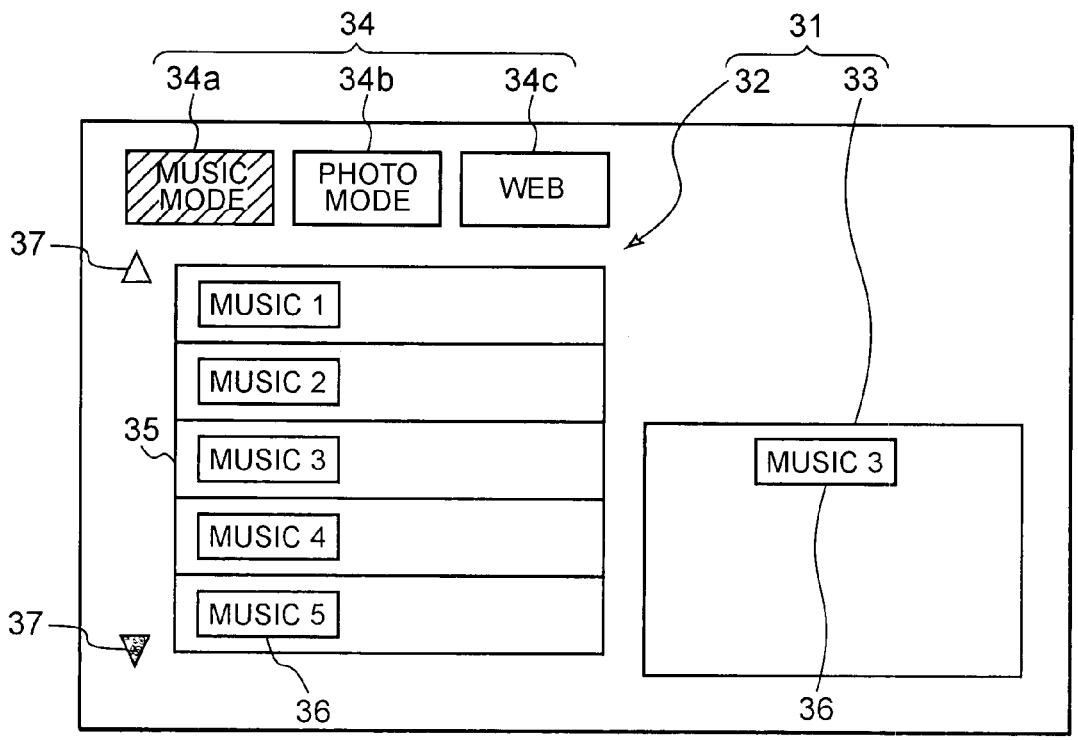
FIG. 3 is a view showing a state of the management screen after the title information of the music piece is copied to the temporary stock area in the data management apparatus whose edit mode is the music mode in the first embodiment.

FIG. 3 shows the management screen 31 after copying the music title information 36 to the temporary stock area 33 in the data management apparatus 1 whose edit mode is in the music mode. As shown in FIG. 3, after the drag and drop operation, the title information 36 of "MUSIC 3" exists in both the title list 35 and the temporary stock area 33.

Further, if the pieces of title information 36 in the selected category is too many to display in the title list 35 at a time, the scroll icon 37 can be used to scroll the title list 35 so that other pieces of title information 36 can be displayed.

Figure 4:
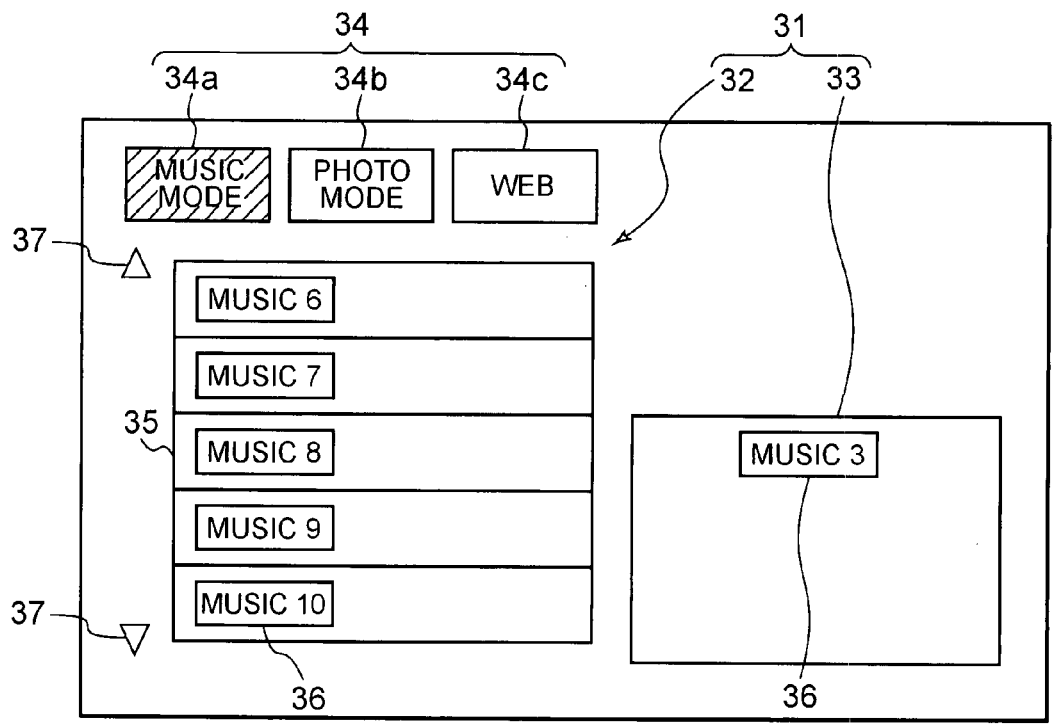
FIG. 4 is a view showing a state of the management screen after a title list is scrolled in the data management apparatus whose edit mode is the music mode in the first embodiment.

FIG. 4 shows the management screen 31 after scrolling the title list 35 in the data management apparatus 1 whose edit mode is in the music mode. FIG. 4 shows a state after scrolling the title list 35 by one page. Specifically, title information 36 of "MUSIC 6" to "MUSIC 10," is displayed.

Figure 5:
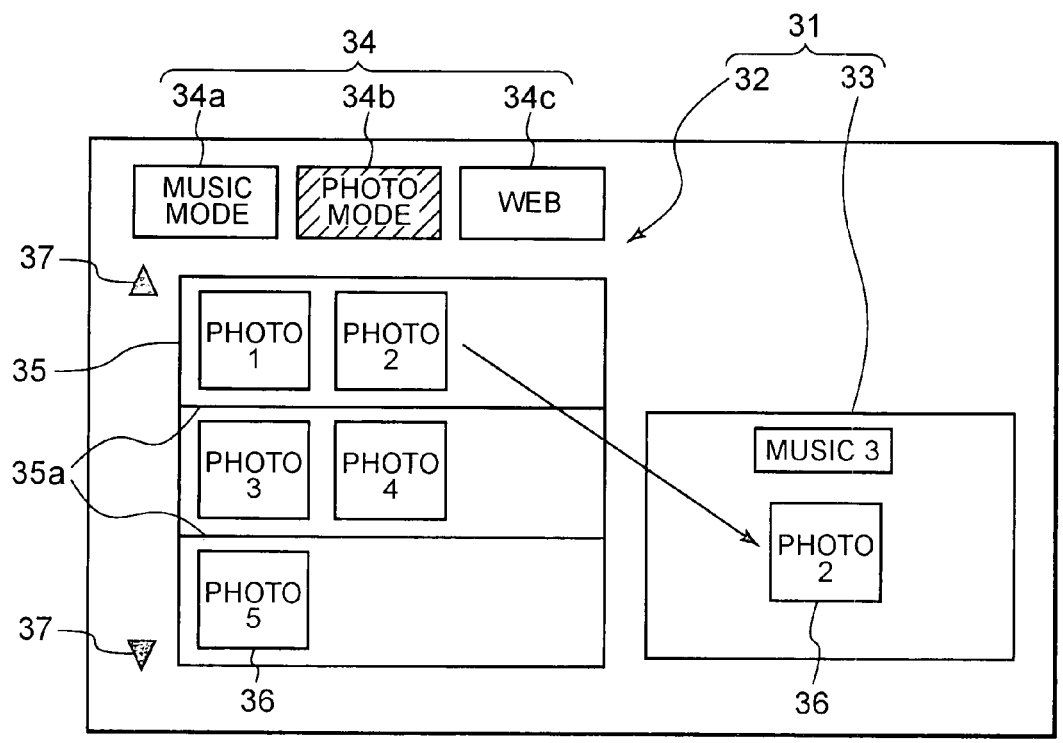
FIG. 5 is a view showing a state upon copying title information of a photo to the temporary stock area in the data management apparatus whose edit mode is a photo mode in the first embodiment.

Next, FIG. 5 shows a state upon copying title information 36 of a photo to the temporary stock area 33 in the data management apparatus 1 whose edit mode is in the photo mode. FIG. 5 is an example in which the photo mode button 34b is operated and hence title information 36 representing the contents of photos (specifically, title information 36 of "PHOTO 1" TO "PHOTO 5") is displayed in the title list 35. Here, when data is photo data, thumbnail information is used as the title information 36 as mentioned above. In addition to use of the thumbnail information, other information such as file name, shooting date and time, etc. can also be used as the title information 36 indicating the content of each photo data.

In this title list 35, subcategory partition lines 35a indicating subcategory partitions are provided so that the photos are classified and displayed by subcategory.

Then, in this example shown in FIG. 5, the title information 36 of "PHOTO 2" is dragged and dropped from the title list 35 to the temporary stock area 33. As a result, the title information 36 of "PHOTO 2" is copied to the temporary stock area 33.

Figure 6:
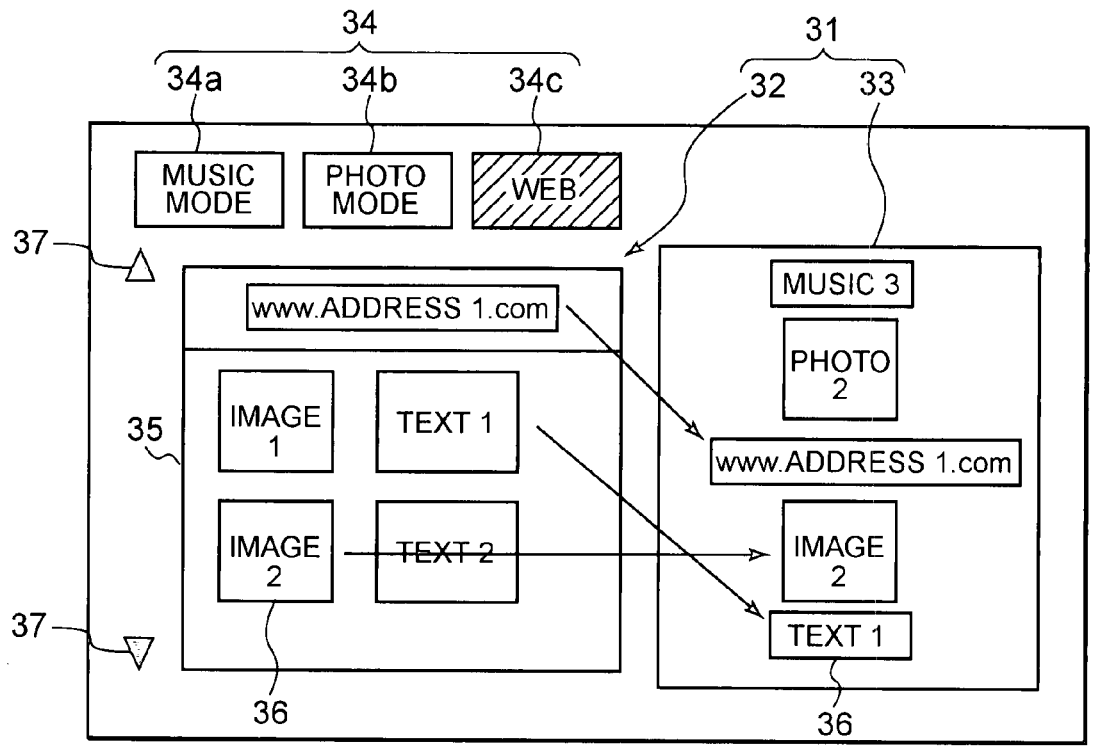
FIG. 6 is a view showing a state upon copying each piece of title information of an address, an image, and a text to the temporary stock area in the data management apparatus whose edit mode is a web mode in the first embodiment.

Then, FIG. 6 shows a state upon copying each piece of title information 36 of an address, an image, and a text to the temporary stock area 33 in the data management apparatus 1 whose edit mode is the web mode. FIG. 6 is an example in which the web button 34c is operated and hence a home page on the Internet is displayed in the title list 35 as a display screen of a so-called web browser. In this example shown in FIG. 6, "ADDRESS" of the home page, "IMAGE 1," "IMAGE 2," "TEXT 1," and "TEXT 2" are displayed on the browser screen as the title information 36.

Note that, although "PHOTO" taken with a digital camera or the like as shown in FIG. 5 is distinguished from "IMAGE" on the home page as shown in FIG. 6, it can be said that both are the same in terms of image data.

Then, in this example, "ADDRESS," "IMAGE 2," and "TEXT 1" are dragged and dropped from the title list 35 to the temporary stock area 33. As a result, the title information 36 of "ADDRESS," "IMAGE 2," and "TEXT 1" is copied to and displayed in the temporary stock area 33.

Figure 7:
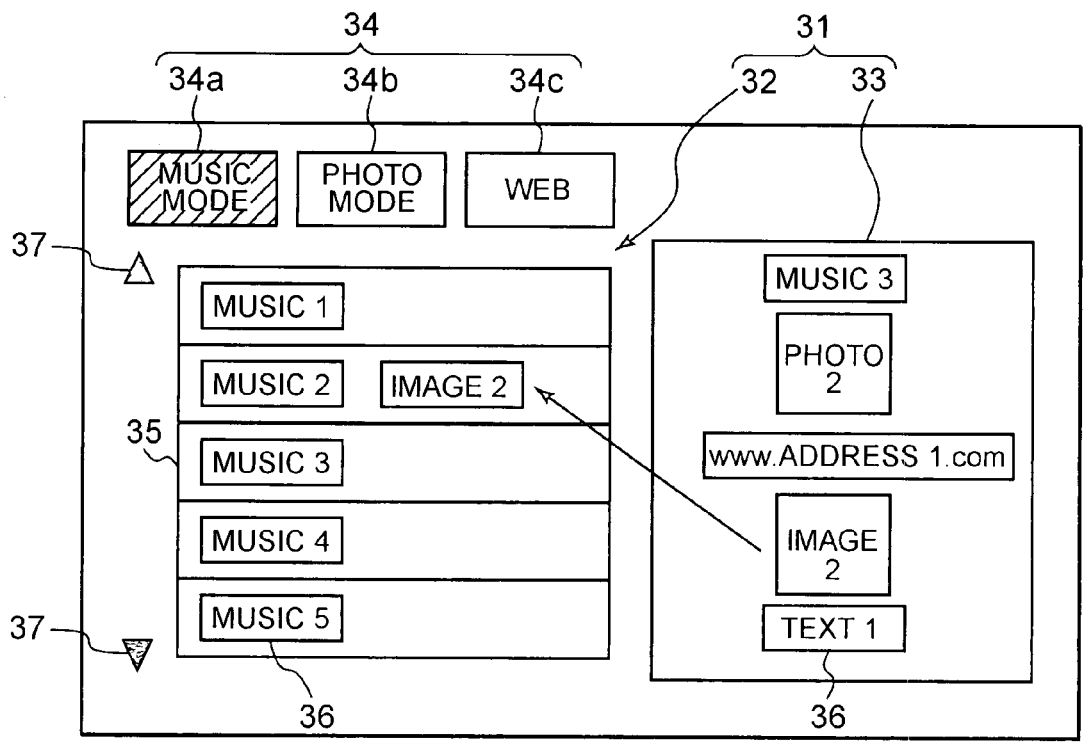
FIG. 7 is a view showing a state of the management screen upon moving the title information of the image from the temporary stock area to the title list in the data management apparatus whose edit mode is the music mode in the first embodiment.

Next, FIG. 7 shows the management screen 31 upon moving the title information 36 of the image from the temporary stock area 33 to the title list 35 in the data management apparatus 1 whose edit mode is the music mode. In the example shown in FIG. 7, the music mode button 34a is operated on condition that the temporary stock area 33 is in the state shown in FIG. 6 to set the data management apparatus 1 to the music mode. The state shown in FIG. 7 is that the title information 36 of "IMAGE 2" is moved from the temporary stock area 33 to the subcategory of the title list 35 to which "MUSIC 2" belongs by drag-and-drop operation. As mentioned above, since the operation of the title information 36 from the temporary stock area 33 to the title list 35 is set to "moving" in the embodiment, the title information 36 of "IMAGE 2" disappears from the temporary stock area 33 after this operation.

Figure 8:
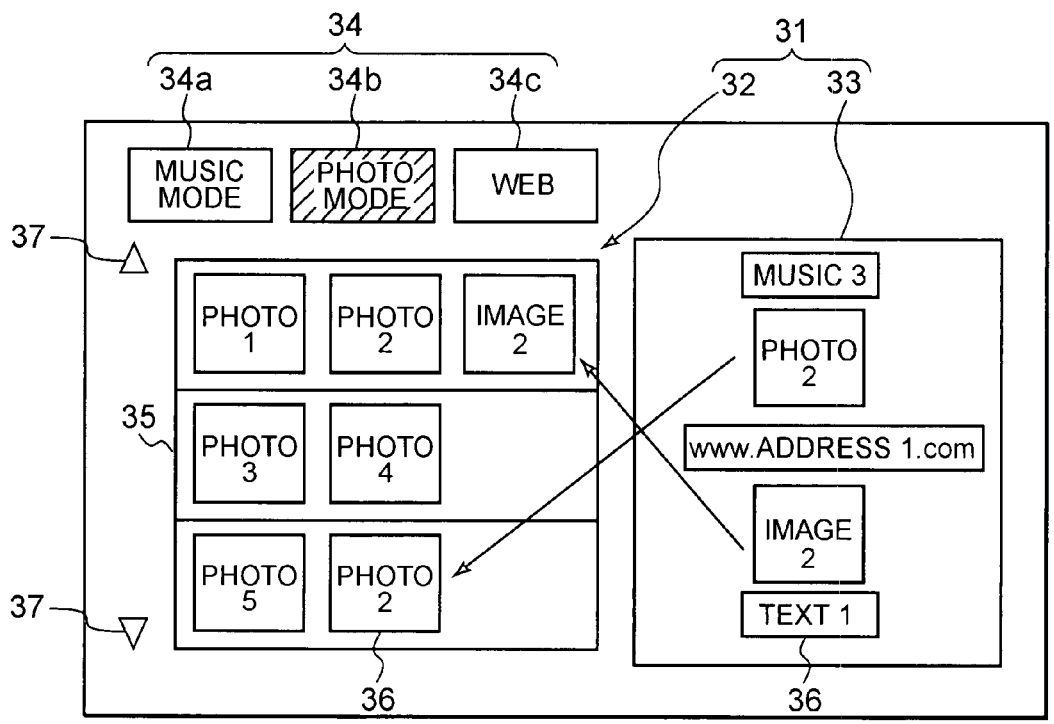
FIG. 8 is a view showing a state of the management screen upon moving the title information of the image and the title information of the photo from the temporary stock area to the title list in the data management apparatus whose edit mode is the photo mode in the first embodiment.

Further, FIG. 8 shows the management screen 31 upon moving the title information 36 of the image and the photo from the temporary stock area 33 to the title list 35 in the data management apparatus 1 whose edit mode is the photo mode. In the example shown in FIG. 8, the photo mode button 34b is operated after the temporary stock area 33 becomes the state shown in FIG. 6 to set the data management apparatus 1 to the photo mode. The state shown in FIG. 8 is that the title information 36 of "IMAGE 2" is moved from the temporary stock area 33 to the subcategory of the title list 35 to which "PHOTO 1" and "PHOTO 2" belong by drag-and-drop operation, and the title information 36 of "PHOTO 2" is moved from the temporary stock area 33 to the subcategory of the title list 35 to which "PHOTO 5" belongs by drag-and-drop operation.

After such operations are done, two pieces of title information 36 of "PHOTO 2" appear in different subcategories of the title list 35.

Next, FIGS. 9 to 15 show states of the management screen when the data management apparatus is set to a processing mode, respectively. Here, the processing mode is a mode for processing data represented by title information 36 temporarily stocked in the temporary stock area 33. Note that "processing" is part of "management." The following describes this processing mode.

When this data management apparatus 1 is set to the processing mode, a processing selection area 38 is displayed, for example, at the top of the temporary stock area 33. This processing selection area 38 is an area for selecting which processing to perform on data represented by the title information 36 temporarily stocked in the temporary stock area 33. In the embodiment, a playback checkbox for selecting playback processing, a printout checkbox for selecting printout processing, and a remix checkbox for selecting remix processing are displayed in the processing selection area 38. Here, "remix" means processing for synchronous playback of selected music and image. Note that, although the processing selection area 38 is provided in the temporary stock area 33, the location of the processing selection area is not limited thereto.

Figure 9:
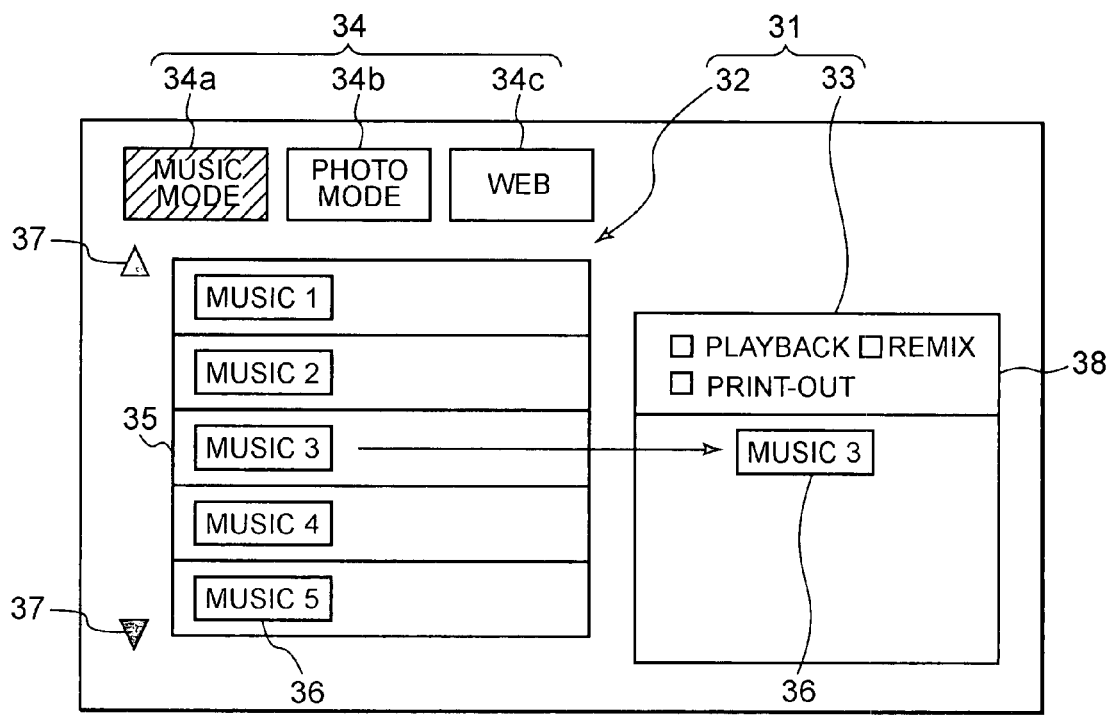
FIG. 9 is a view showing a state of the management screen upon copying music title information to the temporary stock area in the data management apparatus whose processing mode is the music mode in the first embodiment.

FIG. 9 shows the management screen 31 upon copying music title information 36 to the temporary stock area 33 in the data management apparatus 1 whose processing mode is the music mode. In the state of FIG. 9, the music mode button 34a is operated to set the data management apparatus 1 to the music mode. Specifically, the state of FIG. 9 is that the title information 36 of "MUSIC 3" is copied from the title list 35 to the temporary stock area 33 by drag-and-drop operation in the same manner as in FIG. 2.

Figure 10:
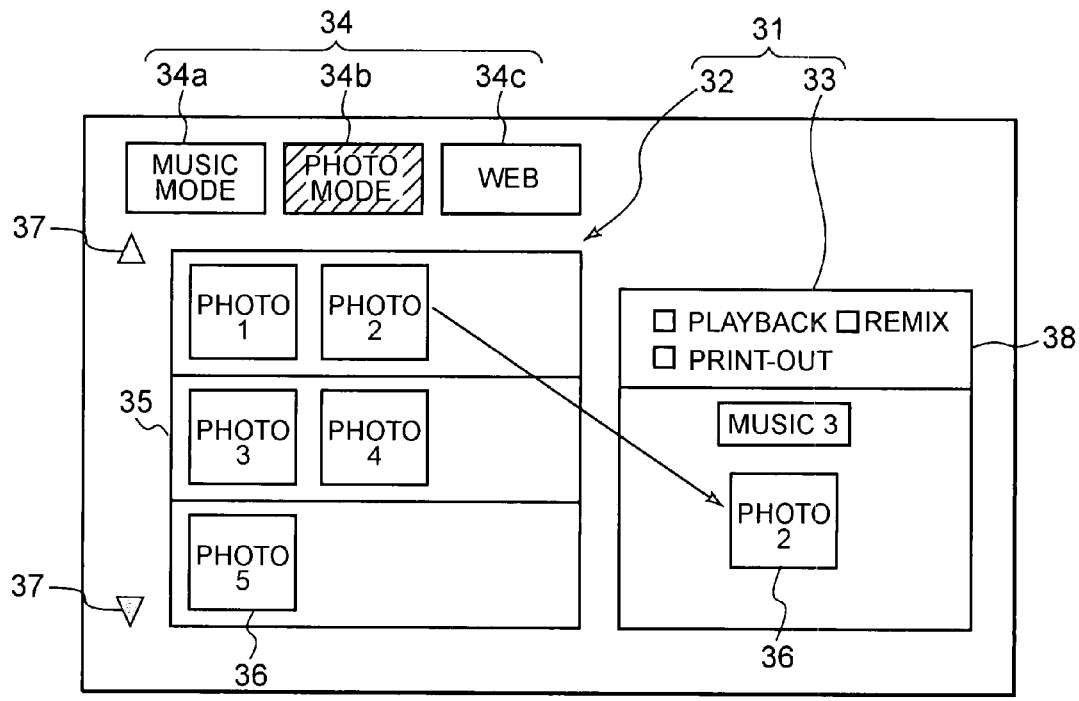
FIG. 10 is a view showing a state of the management screen upon copying photo title information to the temporary stock area in the data management apparatus whose processing mode is the photo mode in the first embodiment.

Next, FIG. 10 shows the management screen 31 upon copying the title information 36 of a photo to the temporary stock area 33 in the data management apparatus 1 whose processing mode is the photo mode. FIG. 10 shows title information 36 representing the contents of photos in the title list 35 after the photo mode button 34b is operated from the state of FIG. 9. The state of FIG. 10 shows that the title information 36 of "PHOTO 2" is copied from the title list 35 to the temporary stock area 33 by drag-and-drop operation in the same manner as in FIG. 5 mentioned above.

Figure 11:
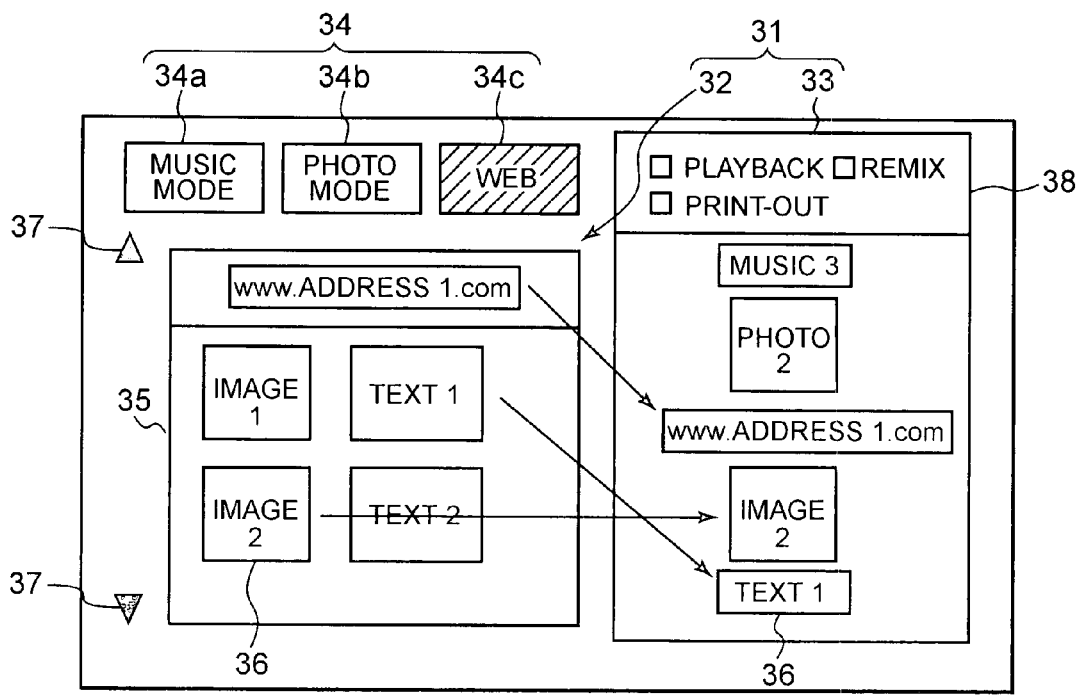
FIG. 11 is a view showing a state of the management screen upon copying each piece of title information of the address, the image, and the text to the temporary stock area in the data management apparatus whose processing mode is the web mode in the first embodiment.

Then, FIG. 11 shows the management screen 31 upon copying each piece of title information 36 of the address, the image, and the text to the temporary stock area 33 in the data management apparatus 1 whose processing mode is the web mode. FIG. 11 shows that a home page on the Internet is displayed in the title list 35 after the web button 34c is operated from the state of FIG. 10. The state of FIG. 11 is that "ADDRESS," "IMAGE 2," and "TEXT 1" are copied from the title list 35 to the temporary stock area 33 by drag-and-drop operation in the same manner as in FIG. 6 mentioned above.

As shown in FIGS. 9 to 11, the title information 36 can be copied from the title list 35 to the temporary stock area 33 in the processing mode in the same manner as in the edit mode mentioned above.

Figure 12:
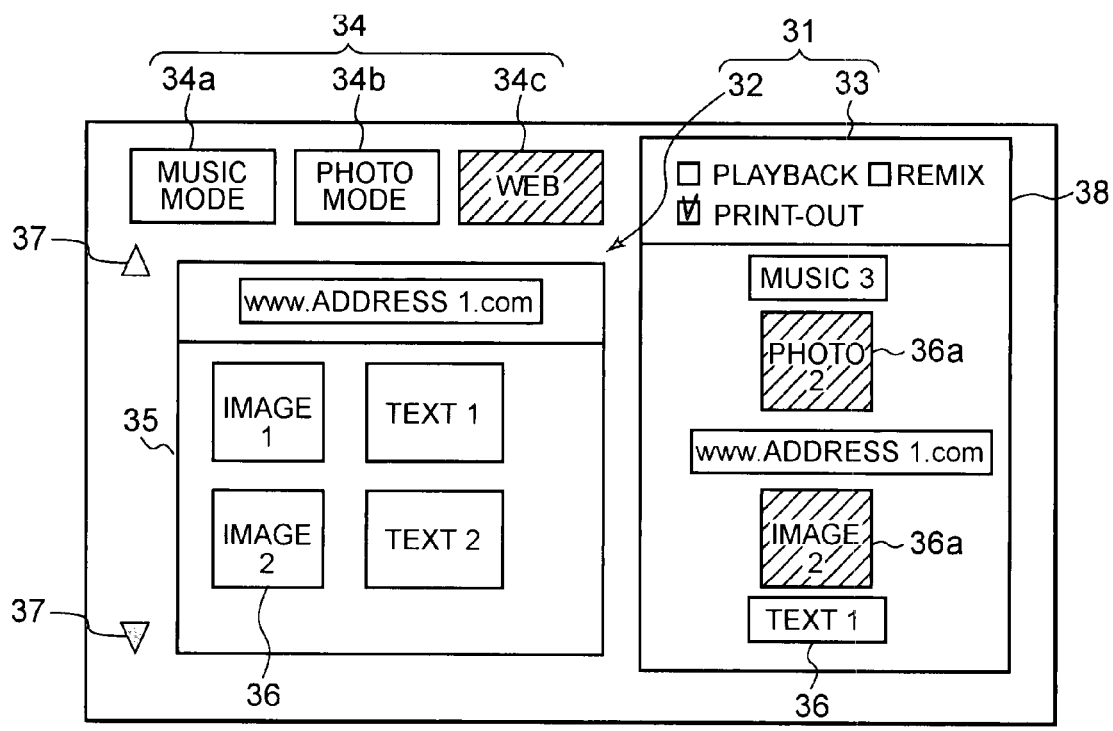
FIG. 12 is a view showing a state upon checking a printout checkbox in a processing selection area of the temporary stock area in the data management apparatus whose mode is the processing mode in the first embodiment.

FIG. 12 shows a state upon checking printout checkbox in the processing selection area 38 of the temporary stock area 33 in the data management apparatus 1 whose mode is the processing mode. The state shown in FIG. 12 is that the printout checkbox in the processing selection area 38 is checked after the temporary stock area 33 becomes the state shown in FIG. 11. At this time, data of "PHOTO 2" and data of "IMAGE 2" as possible printout targets among the data represented by the title information 36 temporarily stocked in the temporary stock area 33 are automatically selected with a highlight 36a or the like as processing targets. Then, under the control of the processing control part 2b, the data selected through the communication part 15 and the interface 16 are output to and printed on the printer 21.

Figure 13:
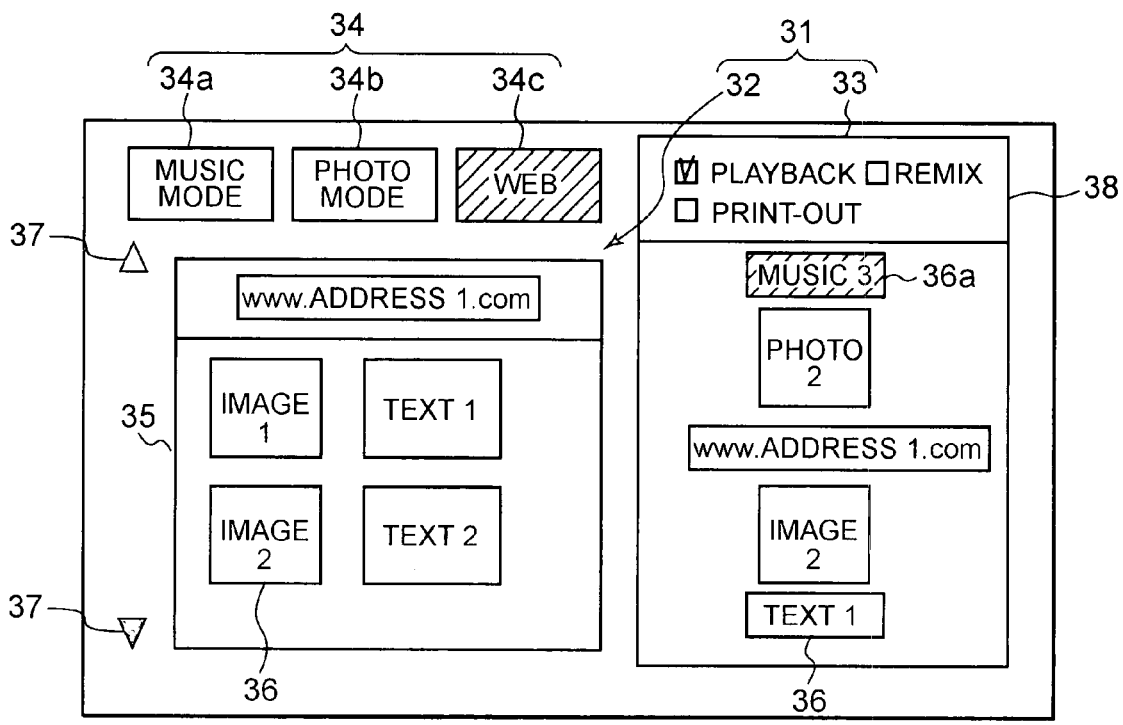
FIG. 13 is a view showing a state upon checking a payback checkbox in the processing selection area of the temporary stock area in the data management apparatus whose mode is the processing mode in the first embodiment.

FIG. 13 shows a state upon checking the playback checkbox in the processing selection area 38 of the temporary stock area 33 in the data management apparatus 1 whose mode is the processing mode. The state shown in FIG. 13 is that the playback checkbox is checked in the processing selection area 38 after the temporary stock area 33 becomes the state shown in FIG. 11. At this time, data of "MUSIC 3" as a possible playback target among the data represented by the title information 36 temporarily stocked in the temporary stock area 33 is automatically selected with the highlight 36a or the like as a processing target. Then, under the control of the processing control part 2b, the data selected through the audio processing part 10 is output to the speaker 20 to perform playback of "MUSIC 3."

Figure 14:
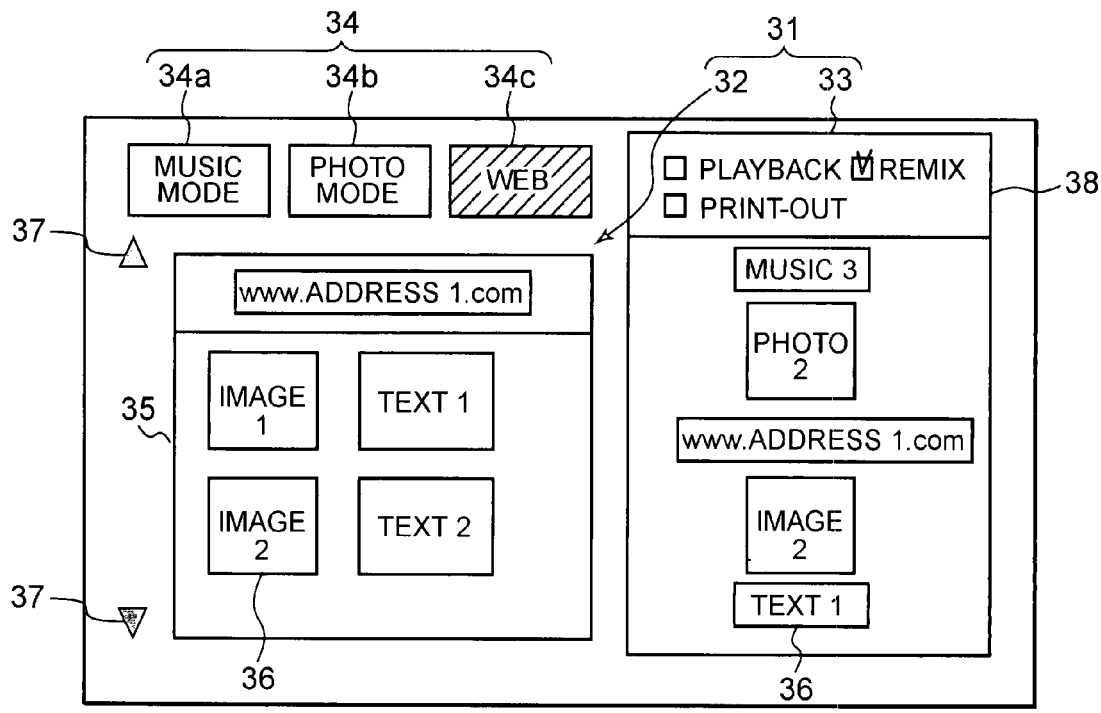
FIG. 14 is a view showing a state of the management screen upon checking a remix checkbox in the processing selection area of the temporary stock area in the data management apparatus whose mode is the processing mode in the first embodiment.

FIG. 14 shows a state of the management screen 31 upon checking the remix checkbox in the processing selection area 38 of the temporary stock area 33 in the data management apparatus 1 whose mode is the processing mode. The state of FIG. 14 is that the remix checkbox in the processing selection area 38 is checked after the temporary stock area 33 becomes the state as shown in FIG. 11. At this time, data of "MUSIC 3" and data of "PHOTO 2" and "IMAGE 2" as possible remix targets among the data represented by the title information 36 temporarily stocked in the temporary stock area 33 are automatically selected as processing targets. Then, under the control of the processing control part 2b, "MUSIC 3" is played back from the speaker 20 through the audio processing part 10, while the display part 3 displays "PHOTO 2" and "IMAGE 2" at predetermined intervals under the control of the display control part 2a in accordance with an instruction from the processing control part 2b. Therefore, the user can enjoy music while viewing the photo and the image.

In this example shown in FIG. 14, the pieces of title information 36 automatically selected as remix processing targets are not highlighted, but they can, of course, be highlighted.

Figure 15:
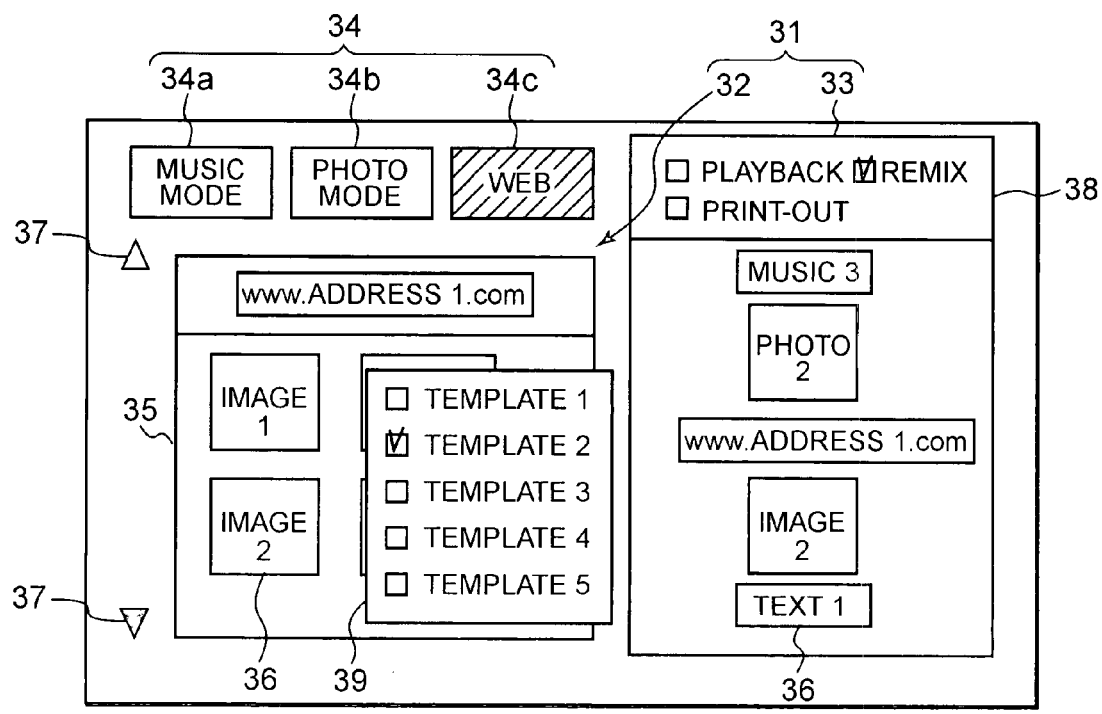
FIG. 15 is a view showing a state of the management screen upon checking the remix checkbox in the processing selection area of the temporary stock area and then selecting a template in the data management apparatus whose mode is the processing mode in the first embodiment.

FIG. 15 shows the management screen 31 upon further selecting a template after checking the remix checkbox in the processing selection area 38 of the temporary stock area 33 in the data management apparatus 1 whose mode is the processing mode. The state of FIG. 15 is that the remix checkbox in the processing selection area 38 is checked and further a template is selected after the temporary stock area 33 shown in FIG. 14 becomes the state shown in FIG. 11.

Here the "template" is to specify how to change from the display of an image to that of another. For example, appropriate combinations of patterns of image display upon changing the screen, such as to slide the image from left to right or to fade in or fade out the image, are preset as templates. These plural kinds of templates are prepared and prestored in the ROM 6.

When manual template selection is set for remixing, if the remix checkbox is checked, a template selection box 39 as shown in FIG. 15 automatically appears. Then, in this example, the checkbox of template 2 in templates 1 to 5 displayed in the template selection box 39 is checked. After that, the user can operate an execute button (not shown) on the operation part 4 to perform remix playback according to the template 2.

On the other hand, when automatic template selection is set for remixing or no use of templates is set, this template selection box 39 does not appear.

In the processing mode as shown in FIGS. 9 to 15, if any of the checkboxes in the processing selection area 38 is checked without selecting any title information 36 temporarily stocked in the temporary stock area 33, data corresponding to the title information 36 in the temporary stock area 33 as possible targets for the checked processing are all automatically selected and processed.

On the other hand, after desired title information 36 is selected from the title information 36 temporarily stocked in the temporary stock area 33, if any checkbox to enable processing of the selected title information 36 is checked in the processing selection area 38, only data corresponding to the selected title information 36 is processed.

Figure 16:
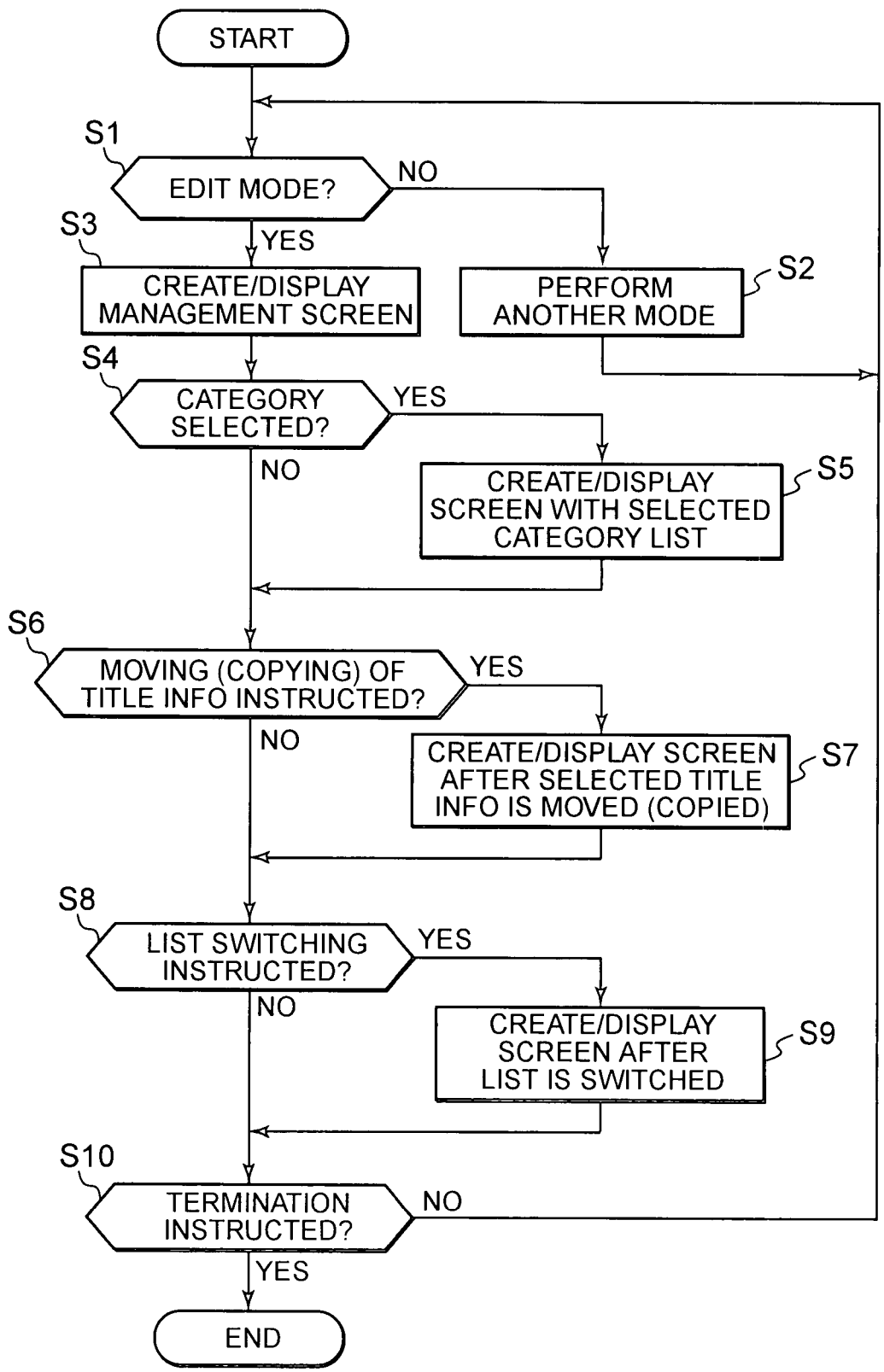
FIG. 16 is a flowchart showing a procedure in the edit mode in the data management apparatus according to the first embodiment.

Next, FIG. 16 is a flowchart showing a procedure in the edit mode in the data management apparatus 1.

When this procedure is started, the control part 2 determines whether this data management apparatus 1 is set in the edit mode (step S1).

Here, if determining that it is not set in the edit mode, the control part 2 performs processing for another mode (step S2) and returns to the processing of step S1 at predetermined intervals to determine whether the data management apparatus 1 is set in the edit mode.

If it is determined in step S1 that the data management apparatus 1 is set in the edit mode, the screen creating part 9 creates a management screen 31 as shown in FIG. 2 under the control of the control part 2, and the display part 3 displays the management screen 31 under the control of the display control part 2a (step S3).

After that, it is determined whether the category of title information to be displayed in the title list 35 is selected with an operation of any mode button 34 (step S4).

If it is determined in step S4 that any category is selected with the operation of any mode button 34, the screen creating part 9 creates a title list 35 in which pieces of title information of the selected category are listed. Then, the display part 3 displays the created title list 35 on the management screen 31 under the control of the display control part 2a (step S5).

Note that, if it is determined in step S4 that no category is selected, the procedure in the edit mode can be configured to automatically display a predetermined title list 35 when no title list 35 is displayed yet, such as immediately after the processing of this data management apparatus 1 is started.

Thus, upon completion of the processing of step S5, or when it is determined in the above-mentioned step S4 that no category is selected, it is then determined whether moving (or copying) of the title information 36 is instructed by dragging and dropping the title information 36 (step S6).

If it is determined in step S6 that moving (or copying) of the title information 36 is instructed, the screen creating part 9 creates a screen after the selected title information 36 is moved (or copied) according to the instruction content, and the display part 3 displays the screen under the control of the display control part 2a (step S7).

After completion of this processing of step S7, or if it is determined in the above-mentioned step S6 that moving (or copying) of title information 36 is not instructed, it is then determined whether changing of the title list 35 is instructed with an operation of the scroll icon 37 to scroll the title information 36 (step S8).

If it is determined in step S8 that changing of the title list 35 is instructed, the screen creating part 9 scrolls the title information 36 to create a screen with the title list 35 changed, and the display part 3 displays the screen under the control of the display control part 2a (step S9).

After completion of this processing of step S9, or if it is determined in the above-mentioned step S8 that changing of the title list 35 is not instructed, the control part 2 then determines whether termination of the above-mentioned sequence of processing operations is instructed via the operation part 4 (step S10). If it is determined in step S10 that the termination is not instructed, the procedure returns to step S1 to repeat the above-mentioned processing operations.

On the other hand, if it is determined in step S10 that the termination is instructed, this procedure is ended.

Figure 17:
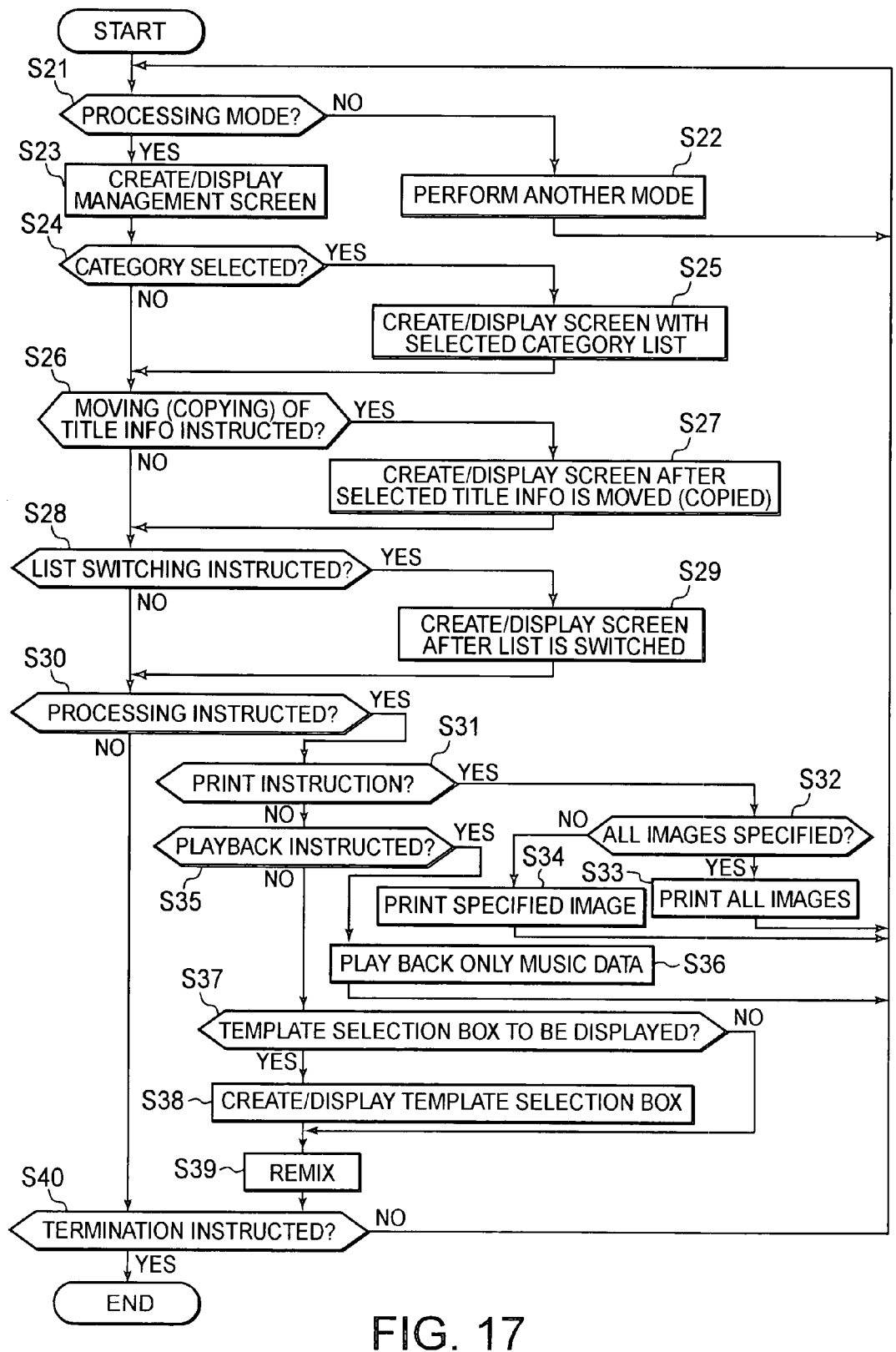
FIG. 17 is a flowchart showing a procedure in the processing mode in the data management apparatus according to the first embodiment.

Next, FIG. 17 is a flowchart showing a procedure in the processing mode in the data management apparatus 1.

When this procedure is started, the control part 2 determines whether this data management apparatus 1 is set in the processing mode (step S21).

Here, if determining that it is not set in the processing mode, the control part 2 performs processing for another mode (step S22), and returns to the processing of step S21 at predetermined intervals to determine whether the data management apparatus 1 is set in the processing mode.

If it is determined in step S21 that the data management apparatus 1 is set in the processing mode, the screen creating part 9 creates a management screen 31 as shown in FIG. 9 or the like under the control of the control part 2, and the display part 3 displays the management screen 31 under the control of the display control part 2a (step S23).

After that, it is determined whether the category of title information to be displayed in the title list 35 is selected with an operation of any mode button 34 (step S24).

If it is determined in step S24 that any category is selected with the operation of any mode button 34, the screen creating part 9 creates a title list 35 in which pieces of title information of the selected category are listed. Then, the display part 3 displays the created title list 35 on the management screen 31 under the control of the display control part 2a (step S25).

Note that, if it is determined in step S24 that no category is selected, the procedure in the processing mode can be configured to automatically display a predetermined title list 35 when no title list 35 is displayed yet, such as immediately after the processing of this data management apparatus 1 is started.

Thus, upon completion of the processing of step S25, or when it is determined in the above-mentioned step S24 that no category is selected, it is then determined whether moving (or copying) of the title information 36 is instructed by dragging and dropping the title information 36 (step S26).

If it is determined in step S26 that moving (or copying) of the title information 36 is instructed, the screen creating part 9 creates a screen after the selected title information 36 is moved (or copied) according to the instruction content, and the display part 3 displays the screen under the control of the display control part 2*a* (step S27).

After completion of this processing of step S27, or if it is determined in the above-mentioned step S26 that moving (or copying) of title information 36 is not instructed, it is then determined whether changing of the title list 35 is instructed with an operation of the scroll icon 37 to scroll the title information 36 (step S28).

If it is determined in step S28 that changing of the title list 35 is instructed, the screen creating part 9 scrolls the title information 36 to create a screen with the title list 35 changed, and the display part 3 displays the screen under the control of the display control part 2*a* (step S29).

After completion of this processing of step S29, or if it is determined in the above-mentioned step S28 that changing of the title list 35 is not instructed, it is then determined whether any of the checkboxes in the processing selection area 38 is checked to instruct processing (step S30).

Here, if it is determined that the processing instruction is given, it is then determined whether the printout checkbox is checked, i.e., a print instruction is given (step S31).

If it is determined in step S31 that the print instruction is given, it is then determined whether any piece of title information 36 is selected as a target for printout processing, i.e., whether an option to automatically specify all images is selected (step S32).

If it is determined in step S32 that the printout checkbox is checked with no piece of title information 36 selected in the temporary stock area 33, all images of all data belonging to the category of image data in the temporary stock area 33 are printed out on the printer 21 under the control of the processing control part 2*b* (step S33).

Further, if it is determined that the printout checkbox is checked after title information 36 related to any image data in the temporary stock area 33 is selected, only the image data represented by the selected title information 36 is printed out on the printer 21 under the control of the processing control part 2*b* (step S34).

On the other hand, if it is determined in step S31 that no print instruction is given, it is then determined whether the playback checkbox is checked, i.e., a playback instruction is given (step S35).

If it is determined in step S35 that the playback instruction is given, music playback is performed on all data belonging to the music category through the speaker 20 under the control of the processing control part 2*b* (step S36). Note that, although all music data are automatically played back here, if the playback checkbox is checked after any piece of title information 36 representing music data is selected in a manner like in the case of image data mentioned above, this part of the procedure can be configured to play back only selected music data.

Further, if it is determined in step S35 that no playback instruction is given, since it means that the remix checkbox is checked, i.e., that a remix instruction is given, it is then determined whether an option to display the template selection box 39 is set (step S37).

If it is determined in step S37 that the option to display the template selection box 39 is set, the screen creating part 9 creates the template selection box 39, and the display part 3 displays it under the control of the display control part 2*a* (step S38). Then, after a template is selected through the template selection box 39, the procedure goes to the next processing step.

After completion of this processing of step S38, or if it is determined in step S37 that the option to display the template selection box 39 is not set, remix processing is performed on all data belonging to the music category and placed in the temporary stock area 33 (step S39). In the remix processing, music playback is performed through the speaker 20 under the control of the processing control part 2*b*, while the display part 3 displays all data belonging to the category of image data at predetermined intervals under the control of the display control part 2*a* in accordance with instructions from the processing control part 2*b*. Note that this remix processing can also be configured to play back only selected music data or to display only selected image data.

After completion of the above-mentioned processing step S33, S34, S36, or S39, the procedure returns to the above-mentioned step S21 to repeat the above-mentioned processing operations.

On the other hand, if it is determined in step S30 that no processing is instructed, it is then determined whether termination of the above-mentioned sequence of processing operations is instructed via the operation part 4 (step S40). If it is determined that the termination is not instructed, the procedure returns to step S21 to repeat the above-mentioned processing operations.

On the other hand, if it is determined in step S40 that the termination is instructed, this procedure is ended.

In the above description, playback, printout, and remix are taken as examples of processing selectable in the processing selection area 38. However, the selectable processing is not limited thereto, and other various processing such as erase and transfer is also made selectable. For example, if data is address data, access processing performed by a browser is made selectable.

Further, although the above description takes the still image as an example of the image, even the moving image can, of course, be used as a management target for editing or processing. In this case, processing for playing back a moving image and the like can be considered as the processing.

Furthermore, although the above description takes music, image, and Internet as examples of categories, the categories are not limited to those. For example, the creation date of data or a folder created in the permanent storage part 7 can be used as a category. Thus, various attributes capable of classifying data can be used as categories.

In addition, the categories do not need to be exclusive to one another. For example, although music and still image are exclusive categories (i.e., there is no data that is a music piece and a still image), music and Internet or image and Internet are not exclusive categories because both image data and music data can be included in the Internet data. Thus, a wide variety of categories can be used as long as they can function as partitions capable of classifying data.

According to the first embodiment described above, data of different categories such as image, music, and text can be managed in an integrated manner with the same ease of use, thereby making it possible to provide an easy-to-use data management apparatus.

Further, since the temporary stock area 33 is arranged to be referable to the title list 35, the title information 36 temporarily stocked in this temporary stock area 33 can always be checked easily. At this time, as for image data, since a thumbnail image is included in a corresponding piece of title information 36, the content of the image data can be checked at a glance.

Thus, an excellent interface for managing data specified from among many data can be provided.

Second Embodiment

Figure 18:
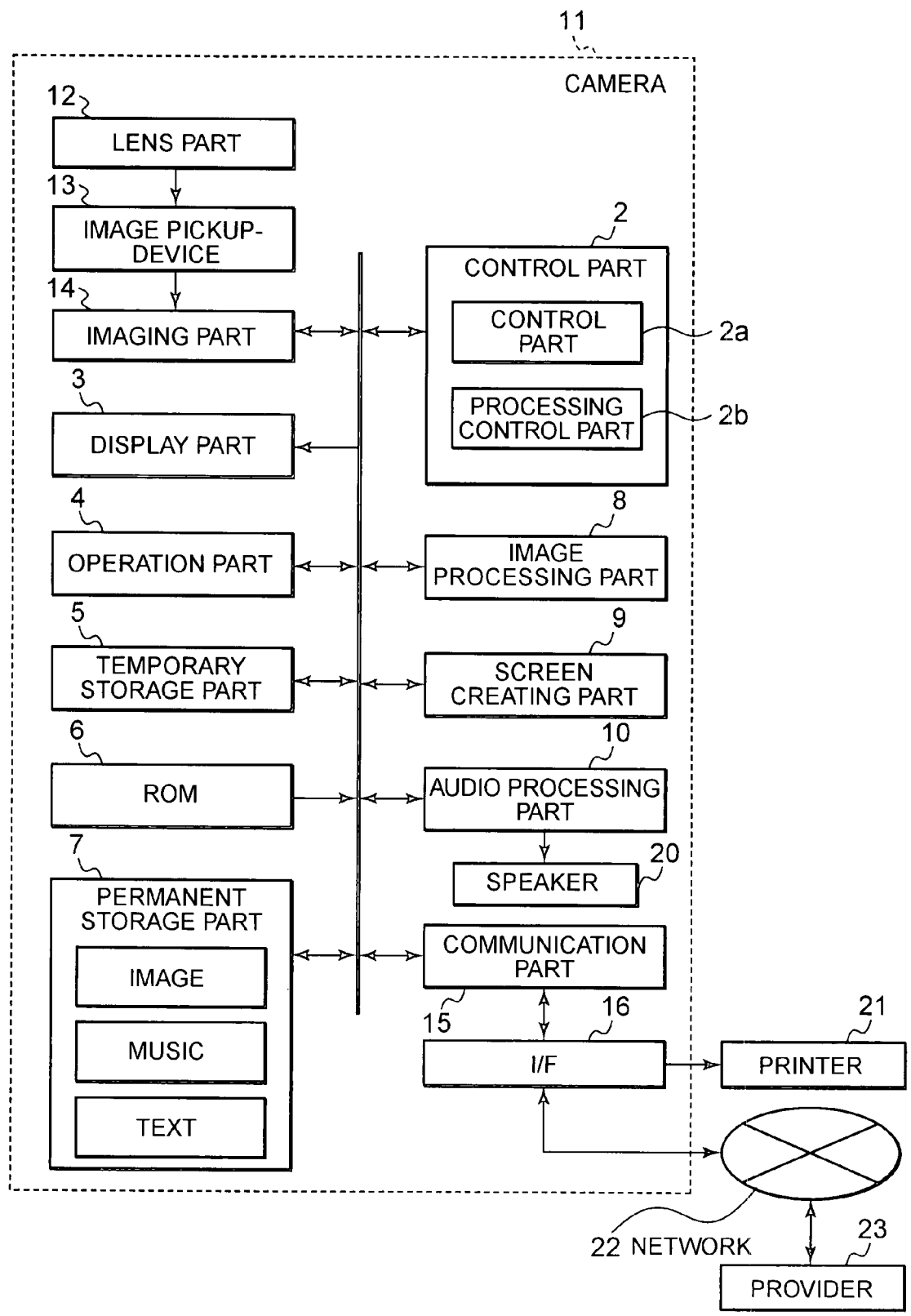
FIG. 18 is a block diagram showing the structure of a camera according to a second embodiment of the present invention.

FIGS. 18 to 24 show a second embodiment of the present invention. FIG. 18 is a block diagram showing the structure of a camera.

In this second embodiment, portions common to those in the aforementioned first embodiment are given the same reference numerals to omit the description thereof, and points different from those in the first embodiment are mainly described below.

This second embodiment relates to a camera including a data management apparatus as shown in the aforementioned first embodiment.

As shown in FIG. 18, a camera 11 includes, like in the data management apparatus 1 shown in FIG. 1, the control part 2, the display part 3, the operation part 4, the temporary storage part 5, the ROM 6, the permanent storage part 7, the image processing part 8, the screen creating part 9, the audio processing part 10, the communication part 15, and the interface (I/F) 16. This camera 11 further includes a lens part 12, an image pickup device 13, an imaging part 14, and a speaker 20.

Here, the operation part 4 includes a touch panel provided on the screen of the display part 3.

The lens part 12 is an optical system for forming a light image of a subject.

The image pickup device 13 photoelectrically converts the subject light image formed through the lens part 12 to output an electrical analog image signal.

The imaging part 14 performs various analog signal processing on the analog image signal output from the image pickup device 13, converts the processed analog image signal to digital image data, and outputs the converted digital image data.

The image processing part 8 also performs various digital signal processing on the image data output from this imaging part 14.

The permanent storage part 7 is configured, for example, using a memory card or the like.

The speaker 20 is provided outside of the data management apparatus 1 in the aforementioned first embodiment, whereas the speaker 20 in this embodiment is incorporated in the camera 11.

Referring next to FIGS. 19 to 24, a management screen in the display part 3 of the camera 11 will be described. Note that although FIGS. 19 to 24 show an example of the management screen in the processing mode, this camera 11 can also be set in the edit mode.

Figure 19:
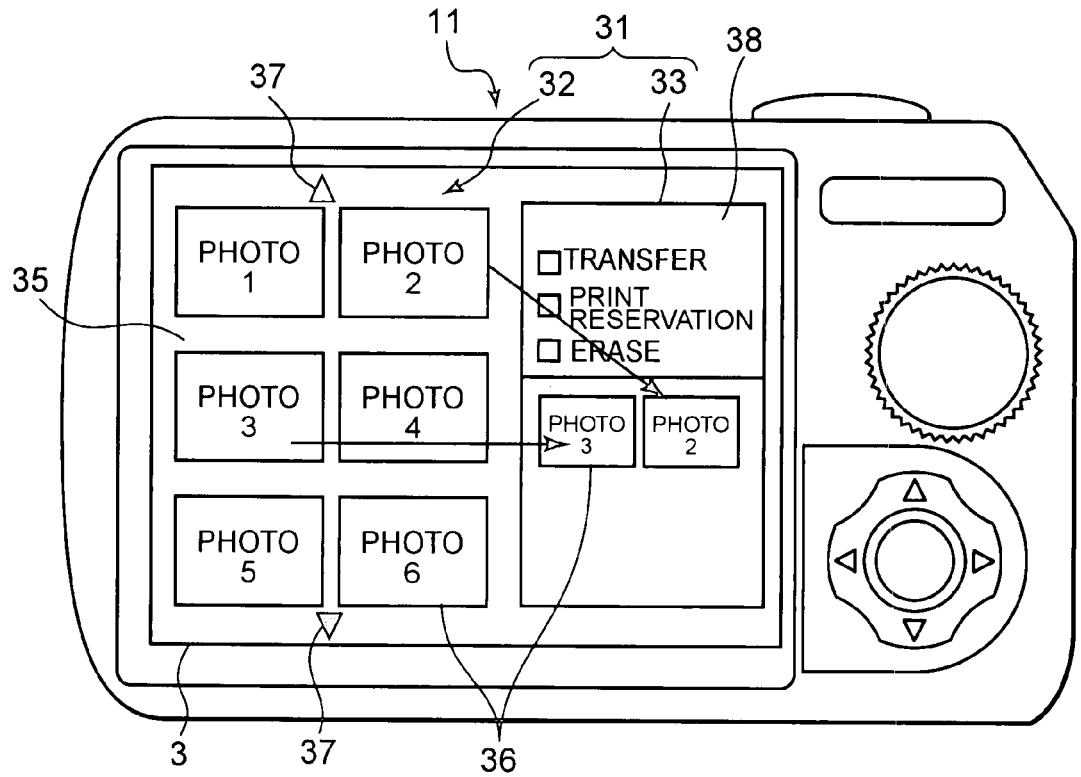
FIG. 19 is a view showing a state upon copying title information of photos from a title list to a temporary stock area on a management screen of the camera according to the second embodiment.

FIG. 19 shows a state upon copying title information 36 of a photo from the title list 35 to the temporary stock area 33 on the management screen 31 of the camera 11.

Like in the aforementioned first embodiment, the list area 32 and the temporary stock area 33 are arranged to be referable to each other on the management screen 31 displayed in the display part 3.

The title list 35 is displayed in the list area 32. In the camera 11 of this embodiment, the mode button section 34 is not displayed in the list area 32. This is because the display part 3 provided in the camera 11 is relatively small, and there is no problem if the mode button section 34 is displayed.

In the title list 35, pieces of title information 36 representing the content of each image data belonging to the photo category are displayed in the form of a list. Scroll icons 37 are displayed, for example, on upper and lower sides of this title list 35. These scroll icons 37 can be operated through the above-mentioned touch panel of the operation part 4 to scroll up and down the title information 36 to be displayed.

Further, like in the aforementioned first embodiment, the temporary stock area 33 is an area for temporary stock of desired title information 36 selected from among plural pieces of title information 36 displayed in the title list 35. The processing selection area 38 is displayed, for example, at the top of this temporary stock area 33. In the second embodiment, a transfer checkbox for selecting transfer processing, a print reservation checkbox for selecting print reservation processing, and an erase checkbox for selecting erase processing are displayed in this processing selection area 38.

Then, in this example shown in FIG. 19, title information 36 of "PHOTO 1" to "PHOTO 6" is displayed in the title list 35 in the form of thumbnail images as mentioned above.

In this state, the title information 36 of "PHOTO 2" and the title information 36 of "PHOTO 3" are copied from the title list 35 to the temporary stock area 33 by drag-and-drop operation using the touch panel of the operation part 4.

In the example shown, the title information 36 in the temporary stock area 33 is represented in the form of thumbnail images in the same manner as mentioned above except that the display size is slightly smaller than the title information 36 in the title list 35.

Figure 20:
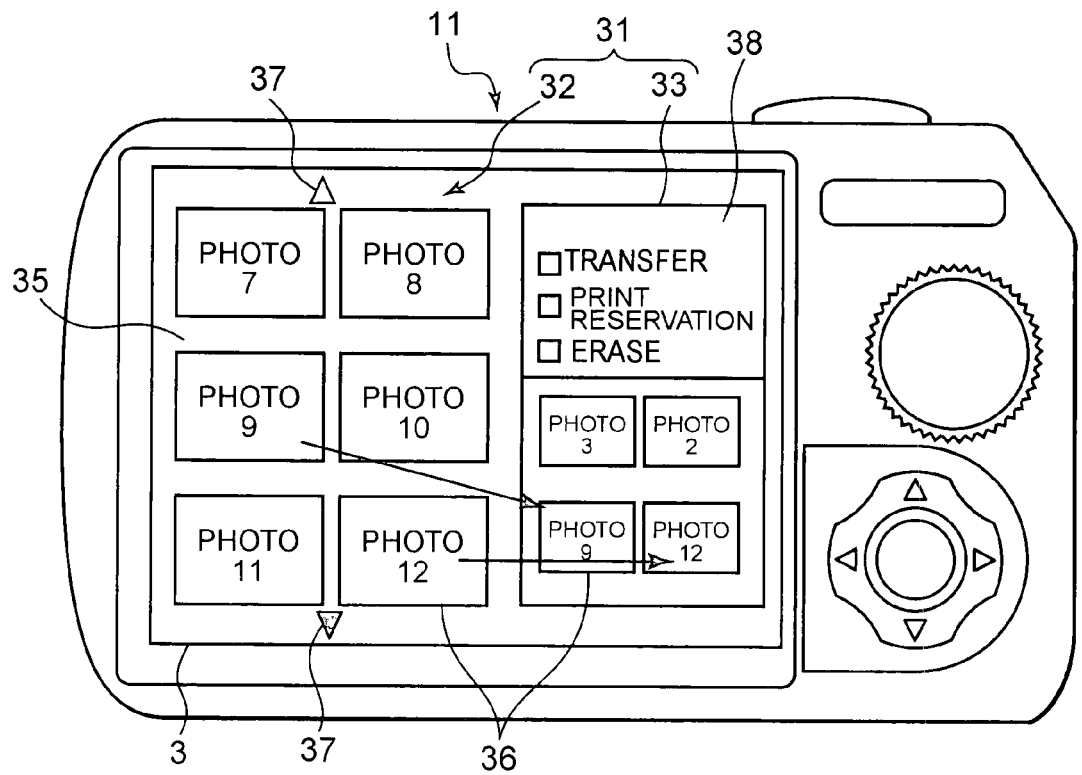
FIG. 20 is a view showing a state upon copying title information of other photos from the title list to the temporary stock area on the management screen of the camera according to the second embodiment.

Next, FIG. 20 shows a state upon copying title information 36 of another photo on the management screen 31 of the camera 11 from the title list 35 to the temporary stock area 33 after scrolling the title list 35.

In the above-mentioned state shown in FIG. 19, when the title list 35 is scrolled by one screen with an operation of the lower scroll icon 37, title information 36 of "PHOTO 7" to "PHOTO 12" is displayed in the form of thumbnail images.

Since the title list 35 and the temporary stock area 33 are arranged to be referable to each other, such an operation makes it easy to view and compare photos having numbers apart from each other at the same time.

Then, in this example shown in FIG. 20, the title information 36 of "PHOTO 9" and the title information 36 of "PHOTO 12" are copied from the title list 35 to the temporary stock area 33.

Figure 21:
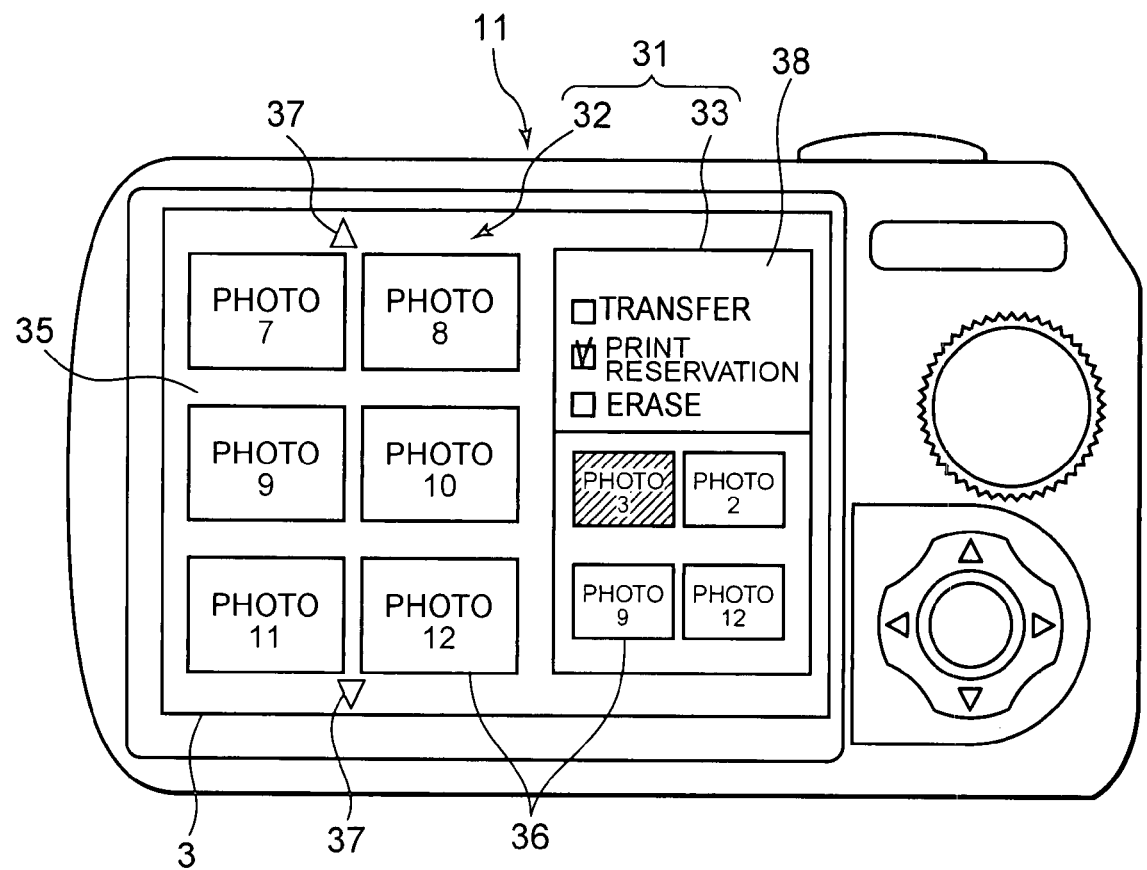
FIG. 21 is a view showing a state upon specifying title information of a photo in the temporary stock area to make a print reservation on the management screen of the camera according to the second embodiment.

Next, FIG. 21 shows a state upon specifying title information 36 of a photo in the temporary stock area 33 to make a print reservation on the management screen 31 of the camera 11.

After the temporary stock area 33 becomes the state shown in FIG. 20, data represented by title information 36 of "PHOTO 3" is selected by tapping on the touch panel to specify the title information 36 of "PHOTO 3" in the temporary stock area 33. At this time, since the selected title information 36 is highlighted, it can be checked at a glance that the data is selected.

After that, the print reservation checkbox is checked in the processing selection area 38 to make a print reservation for the image data represented by the title information 36 of "PHOTO 3" under the control of the processing control part 2b. This print reservation means that the photo reserved for printing is automatically printed out when the camera 11 is connected to the printer 21. Note that this print reservation can be made in accordance with so-called DPOF (Digital Print Order Format).

Figure 22:
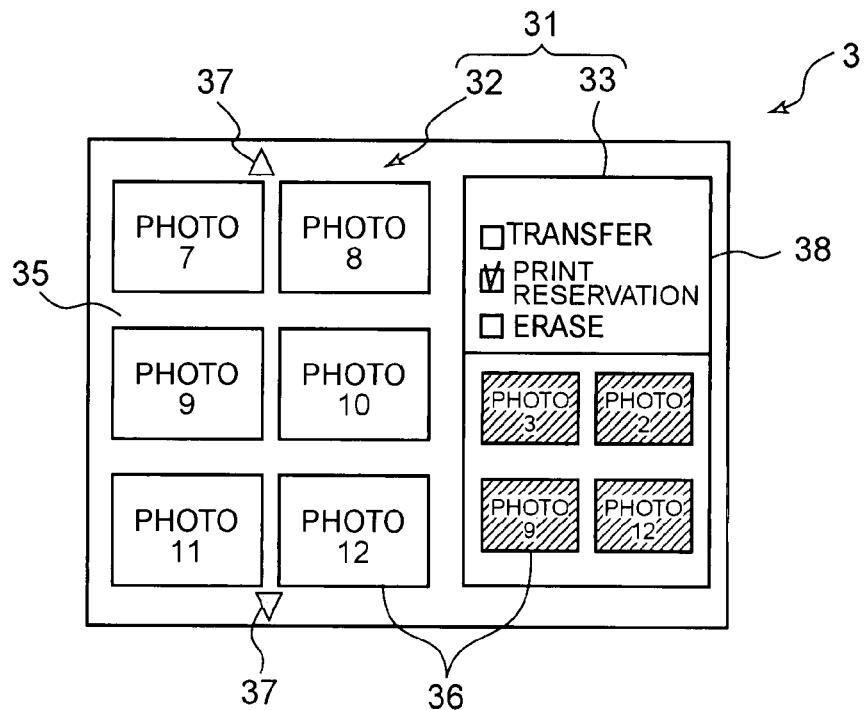
FIG. 22 is a view showing a state upon making print reservations without specifying title information of any photo in the temporary stock area on the management screen of the camera according to the second embodiment.

Further, FIG. 22 shows a state upon making print reservations on the management screen 31 of the camera 11 without specifying title information 36 of any photo in the temporary stock area 33.

In this case, unlike the example described with reference to FIG. 21, all data capable of being targeted for print reservations among data represented by the title information 36 temporarily stocked in the temporary stock area 33 are automatically selected and highlighted. Then, print reservations are made for the selected image data under the control of the processing control part 2b.

Figure 23:
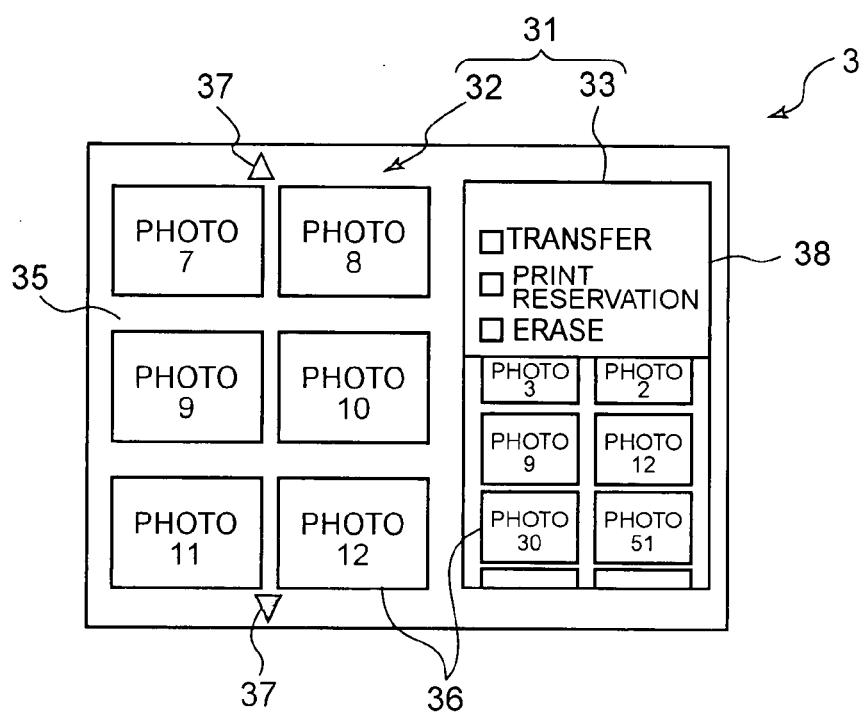
FIG. 23 is a view showing a state upon scrolling title information in the temporary stock area on the management screen of the camera according to the second embodiment.

Next, FIG. 23 shows a state upon scrolling title information 36 in the temporary stock area 33 on the management screen 31 of the camera 11.

When the number of pieces of title information 36 temporarily stocked in the temporary stock area 33 increases, all the pieces cannot be displayed at a time. In considering such a case, the camera 11 is configured to enable scrolling of the title information 36 in the temporary stock area 33. This scroll operation can be performed through the above-mentioned touch panel of the operation part 4.

Figure 24:
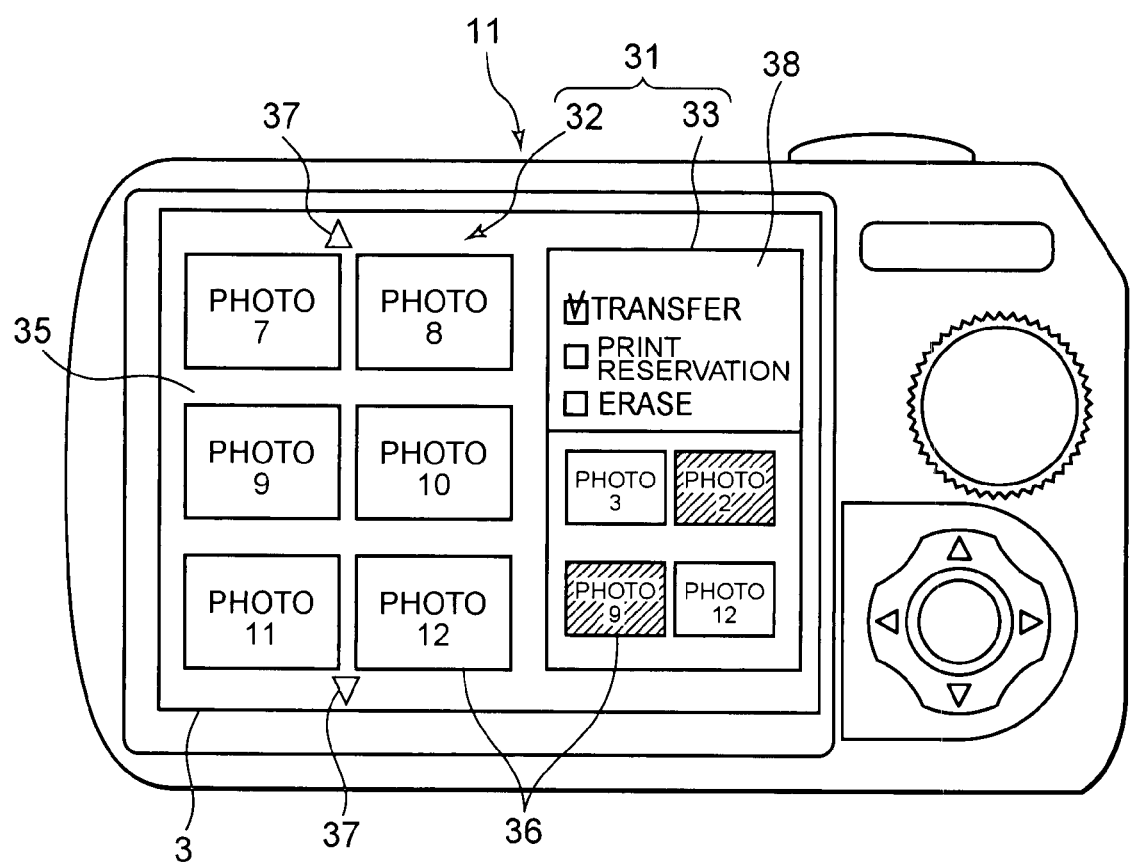
FIG. 24 is a view showing a state upon checking a transfer checkbox after specifying title information in the temporary stock area on the management screen of the camera according to the second embodiment.

Then, FIG. 24 shows a state upon specifying title information 36 in the temporary stock area 33 and checking the transfer checkbox on the management screen 31 of the camera 11.

After the temporary stock area 33 becomes the state shown in FIG. 20, data represented by title information 36 of "PHOTO 2" and data represented by title information 36 of "PHOTO 9" are selected by tapping on the touch panel to specify the title information 36 of "PHOTO 2" and the title information 36 of "PHOTO 9" in the temporary stock area 33. At this time, the selected pieces of title information 36 are highlighted in the same manner as mentioned above.

After that, the transfer checkbox in the processing selection area 38 is checked so that the image data represented by the title information 36 of "PHOTO 2" and the image data represented by the title information 36 of "PHOTO 9" are transferred to an external device through the communication part 15 and the interface 16 under the control of the processing control part 2b.

Further, though not specifically shown, when any title information 36 in the temporary stock area 33 is specified and the erase checkbox in the processing selection area 38 is checked, image data represented by the selected title information 36 is erased after confirmation as to whether to erase the selected photo.

Similarly, when the erase checkbox in the processing selection area 38 is checked without specifying any title information 36 in the temporary stock area 33, all image data represented by title information 36 in the temporary stock area 33 are selected. Then, after confirmation as to whether to erase the photos, all the image data represented by the selected title information 36 are erased.

Further, though not shown, data management performed by the data management apparatus 1 in the aforementioned first embodiment can also be performed in this camera 11 in a like manner. Therefore, for example, music playback and browsing of a home page on the Internet can be possible as well.

According to the second embodiment described above, substantially the same effects as those of the data management apparatus of the aforementioned first embodiment can be achieved in the camera. Therefore, in a camera capable of treating mixed data of music and text as well as image data, an image and another kind of data in a category different from that of the image, for example, a music piece can be managed on the same screen with the same ease of use. This makes it possible to provide an easy-to-use, so-called multimedia-compatible camera.

One major advantage of applying the data management apparatus to a camera is that the user can easily compare photos having shooting sequence numbers apart from each other.

In the above description, although the data management apparatus or the camera to which this data management apparatus is applied is mainly described, the above-described technique can also be applied to a data management method or a data management program for causing a computer to execute this data management method.

The present invention can be suitably used for a data management apparatus for managing data represented by title information, a camera, a recording medium recording a data management program, and a data management method.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A data management apparatus comprising
a screen creating part for creating a management screen to manage data, the management screen including (1) a title list for listing title information representing a content of data belonging to a category and capable of changing to another for listing title information representing a content of data belonging to another category, (2) a temporary stock area arranged to be referable to this title list and capable of temporarily stocking one or more pieces of title information selected from the title list as title information representing a content of data with the view of selecting data proposed for processing from the title list in such a manner that the temporarily stocked title information is referable regardless of changing the category of the title list, and (3) a processing selection area for selecting processing of data represented by title information temporarily stocked in the temporary stock area; and
a processing control part that (1) performs a printing process for image data of the title information stocked temporarily when a printing process is selected on the processing selection area, and (2) performs a music playback process for music data of the title information stocked temporarily when a music playback processing is selected on the processing selection area,
wherein the data management apparatus manages data represented by the title information according to an operation of the title information between the title list and the temporary stock area.

2. The data management apparatus according to claim 1, wherein the title list is configured to accept an operation of title information temporarily stocked in the temporary stock area to the title list regardless of whether the category of data represented by the title information matches the category of data represented by title information listed in the title list.

3. The data management apparatus according to claim 1, wherein the category of data represented by title information listed in the title list includes at least one of an image category, a music category, and an Internet category.

4. The data management apparatus according to claim 1, wherein when the data is image data, the screen creating part creates the management screen in such a manner to include a thumbnail image of the image data in the title information.

5. The data management apparatus according to claim 1, wherein the screen creating part changes the category of the title list by the operation.

6. The data management apparatus according to claim 1, wherein the processing selectable in the processing selection area includes remix processing.

7. A camera comprising:
a screen creating part for creating a management screen to manage data, the management screen including (1) a title list for listing title information representing a content of data belonging to a category and capable of changing to another for listing title information representing a content of data belonging to another category, (2) a temporary stock area arranged to be referable to this title list and capable of temporarily stocking one or more pieces of title information selected from the title list as title information representing a content of data with the view of selecting data proposed for processing from the title list in such a manner that the temporarily stocked title information is referable regardless of changing the category of the title list, and (3) a processing selection area for selecting processing of data represented by title information temporarily stocked in the temporary stock area; and
a processing control part that (1) conducts a printing process for imaging data of the title information stocked temporarily when a printing process is selected on the processing selection area, and (2) conducts a music reproduction process for music data of the title information stocked temporarily when a music production is selected on the processing selection area,
wherein the camera manages data represented by the title information according to an operation of the title information between the title list and the temporary stock area.

8. A recording medium recording a data management program for causing a computer to execute:
creating a management screen for managing data, the management screen including (1) a title list for listing title information representing a content of data belonging to a category and capable of changing to another for listing title information representing a content of data belonging to another category, (2) a temporary stock area arranged to be referable to this title list and capable of temporarily stocking one or more pieces of title information selected from the title list as title information representing a content of data with the view of selecting data proposed for processing from the title list in such a manner that the temporarily stocked title information is referable regardless of changing the category of the title list, and (3) a processing selection area for selecting processing of data represented by title information temporarily stocked in the temporary stock area;
displaying the created management screen;
managing data represented by the title information according to an operation of title information when the operation of title information is performed between the title list and the temporary stock area on the displayed management screen; and
performing (1) a printing process for imaging data of the title information stocked temporarily when a printing process is selected on the processing selection area, and (2) a music reproduction process for music data of the title information stocked temporarily when a music production process is selected on the processing selection area.

9. A data management method comprising:
creating a management screen for managing data, the management screen including (1) a title list for listing title information representing a content of data belonging to a category and capable of changing to another for listing title information representing a content of data belonging to another category, (2) a temporary stock area arranged to be referable to this title list and capable of temporarily stocking one or more pieces of title information selected from title list as title information representing a content of data with the view of selecting data proposed for processing from the title list in such a manner that the temporarily stocked title information is referable regardless of changing the category of the title list, and (3) a processing selection area for selecting processing of data represented by title information temporarily stocked in the temporary stock area;
displaying the created management screen;
managing data represented by the title information according to an operation of title information when the operation of title information is performed between the title list and the temporary stock area on the displayed management screen; and
performing 1) a printing process for imaging data of the title information stocked temporarily when a printing process is selected on the processing selection area, and (2) a music reproduction process for music data of the title information stocked temporarily when a music production process is selected on the processing selection area.

* * * * *